FIG. 17

| FIG. 15 | FIG. 16 |
|---------|---------|

| FIG. 11 | FIG. 12 | FIG. 13 | FIG. 14 |
|---------|---------|---------|---------|
| FIG. 8  | FIG. 9  | FIG. 10 |         |

May 3, 1966 E. E. SCHWENZFEGER ET AL 3,249,918
CONTROL WORD USE IN BIT-BY-BIT DATA COMMUNICATION SYSTEM
Filed Oct. 26, 1962 16 Sheets-Sheet 15

May 3, 1966    E. E. SCHWENZFEGER ET AL    3,249,918
CONTROL WORD USE IN BIT-BY-BIT DATA COMMUNICATION SYSTEM
Filed Oct. 26, 1962            16 Sheets-Sheet 16
*FIG. 20A*
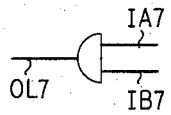
*FIG. 20B*
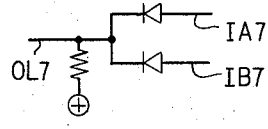
*FIG. 21A*
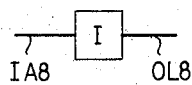
*FIG. 21B*
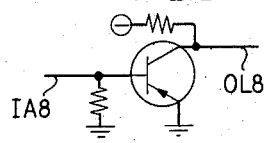
*FIG 22A*
*FIG. 22B*
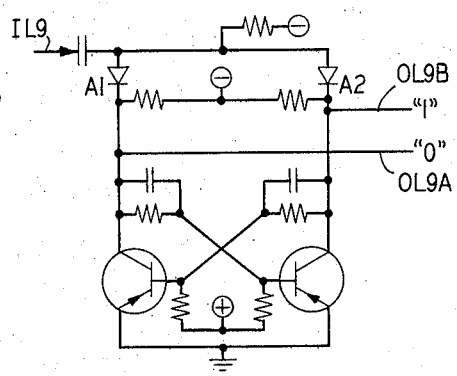
*FIG. 23A*
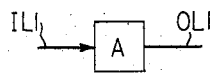
*FIG. 23B*
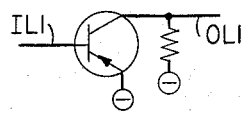
*FIG. 24A*
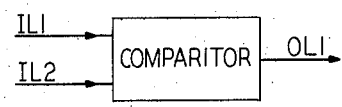
*FIG. 24B*
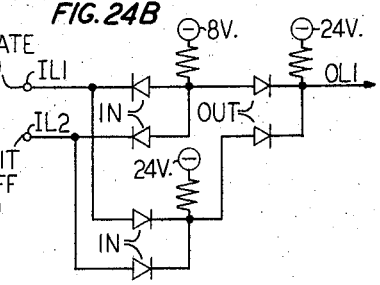

United States Patent Office 3,249,918
Patented May 3, 1966

3,249,918
CONTROL WORD USE IN BIT-BY-BIT DATA COMMUNICATION SYSTEM
Edward E. Schwenzfeger, Red Bank, and Alfred Zarouni, Middletown, N.J., assignors to Bell Telephone Laboratories Incorporated, New York, N.Y., a corporation of New York
Filed Oct. 26, 1962, Ser. No. 234,011
8 Claims. (Cl. 340—146.1)

This invention relates to a method of and apparatus for communicating digital data, and more specifically to such method and apparatus employing a control word for controlling the transmission and reception of high speed digital data on a bit-by-bit basis.

In digital data systems, it is a convenient practice to represent the smallest intelligence element as a bit which is the accepted form of characterizing a binary 1 or 0 digit, and to utilize a plurality of such bits to constitute each word of a message. As digital data are transmitted at high speed, it is imperative to see to it that each message is both transmitted and received with the highest possible degree of accuracy. Obviously, data messages transmitted and/or received with error may tend to result in severe damage, when they are used for their ultimate purposes by data processing equipments. This damage may be in monetary form when the data messages are used, as one example, to determine inventory control; or it may be in the form of property damage or injury to operating personnel, as other examples, when the data messages serve to determine the physical movements of unmanned apparatus.

The present invention therefore contemplates the employment of an improved arrangement for controlling the transmission and reception of discrete words of digital data on a bit-by-bit basis with substantially maximum accuracy.

A principal object of the invention is to improve the efficiency of transmitting and receiving discrete words of high speed digital data messages on a bit-by-bit basis.

Another object is to minimize error in the bit-by-bit transmission and reception of discrete words of digital data messages.

A further object is to simplify the bit-by-bit transmission and reception of discrete words of digital data messages.

In association with a communication system embodying a plurality of data processing equipments, a transmitter including a memory device for transmitting the text and parity bits of each text word on a bit-by-bit basis therefrom at one terminal data equipment to another terminal data equipment, a receiver including a memory device for recording the text and parity bits at the other terminal data equipment, and a digital data transmission line interconnecting the transmitter and receiver, a specific embodiment of the present invention comprises an additional memory device associated with the text memory device at the transmitter for permanently storing a control word used to control the transmission of discrete text words of each message from the associated text memory device on a bit-by-bit basis to the transmission line, and an additional memory device associated with the text memory device at the receiver for permanently storing a control word used to control the recording of discrete text words of each message received from the transmission line in the associated text memory device at the receiver. Each control word includes only one bit of a certain type, i.e., selectively a binary 1 or 0 bit, for indicating the transmission or the recording of discrete message words so that the bits of each text word of a message are thus recorded in the receiving memory device exactly as they were recorded in the transmitting memory device.

When two or more messages are involved, a control word memory device is associated with each text memory device for each message at each transmitter and receiver.

A feature of the invention resides in the use of identical control words, each including only one bit of a certain type, at both the transmitter and receiver for indicating the termination of the transmission and reception of the text and parity bits constituting the respective text words of each message.

The foregoing and other objects of the invention will be readily understood from the following description taken together with the accompanying drawings in which.

Figure 2:
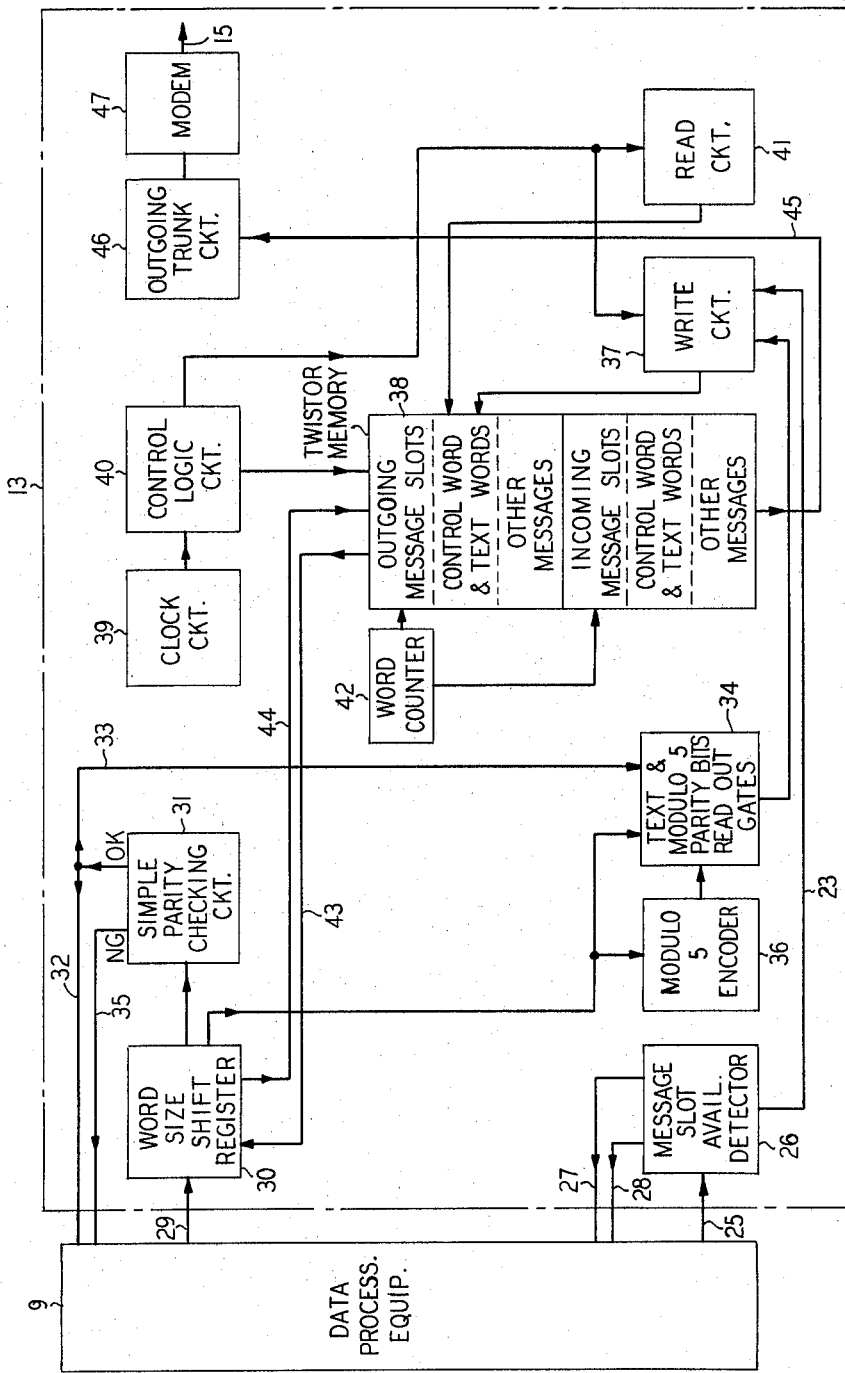
FIGS. 2 and 3 are box diagrams of data transmitting and receiving apparatus, respectively, located at each of the data stations shown in FIG. 1 and including a specific embodiment of the present invention.
Figure 3:
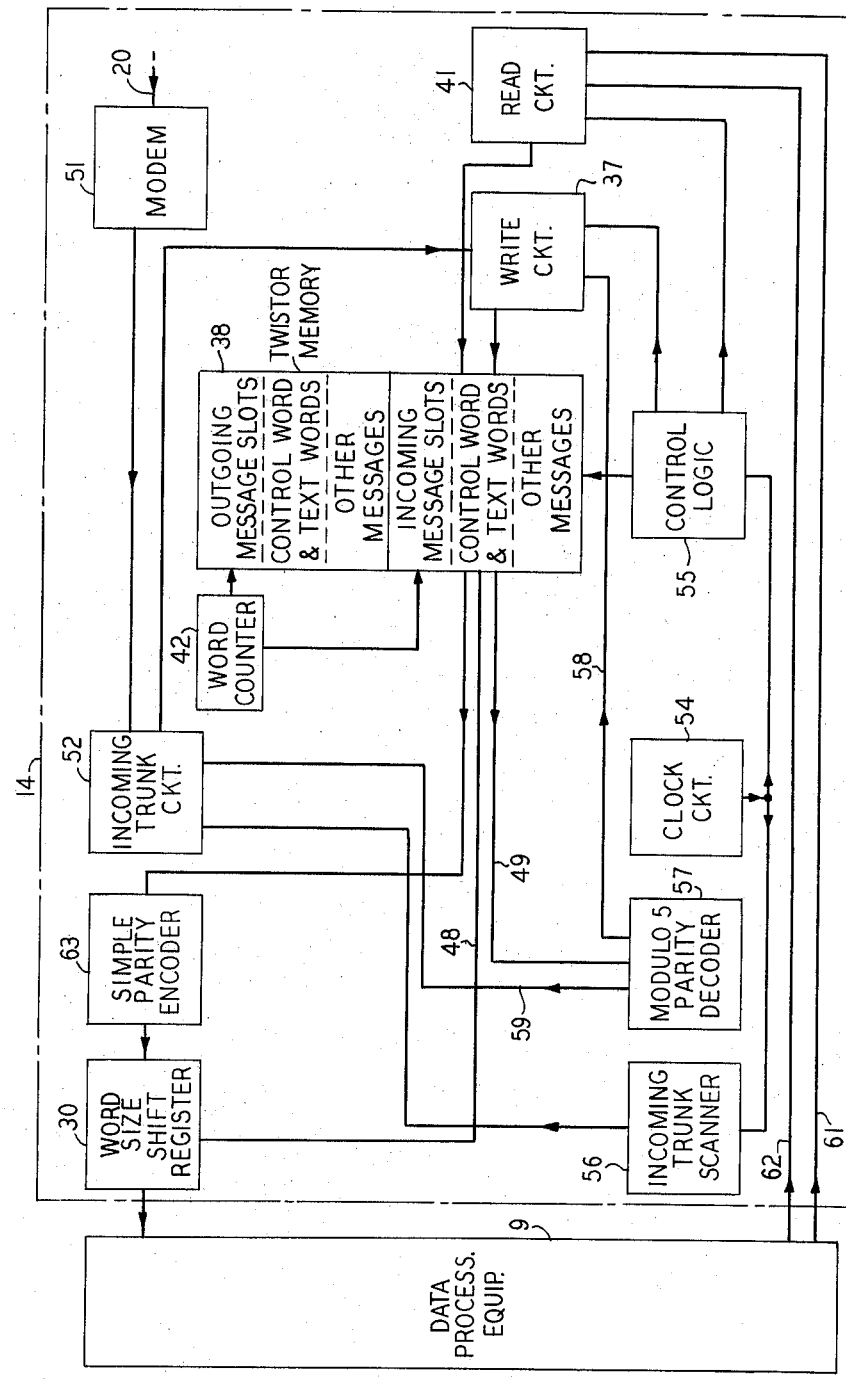
Figure 8:
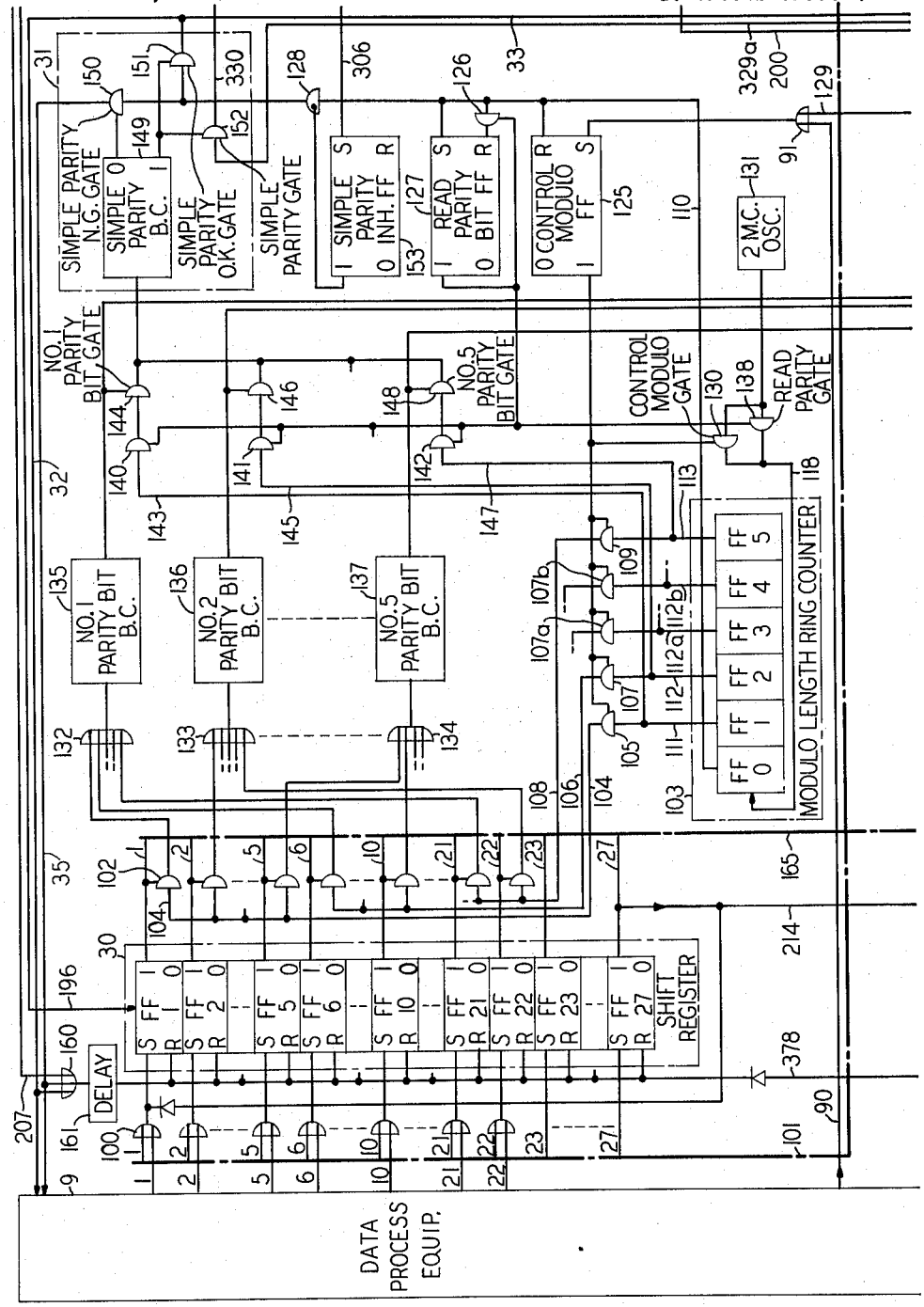
Figure 18:
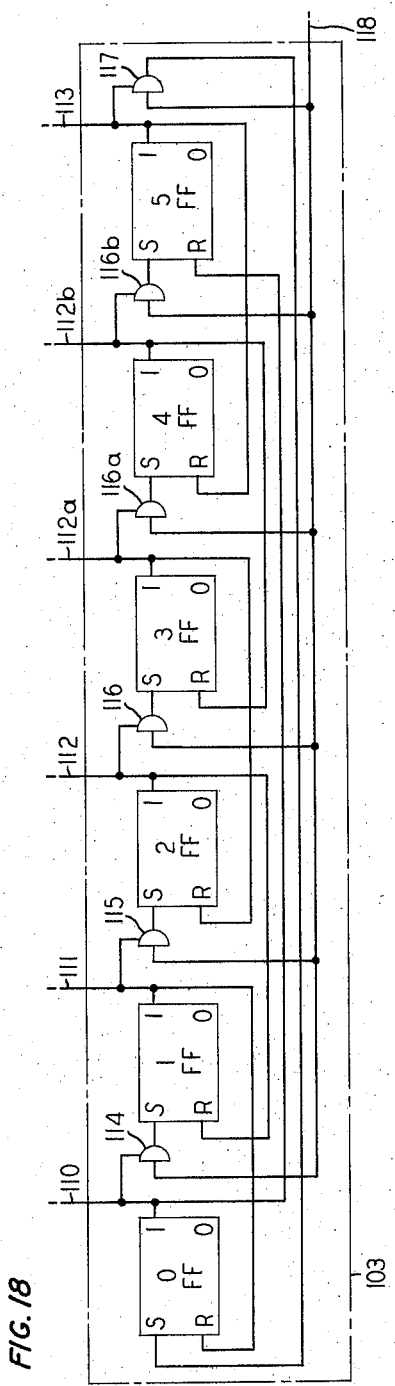
Figure 19:
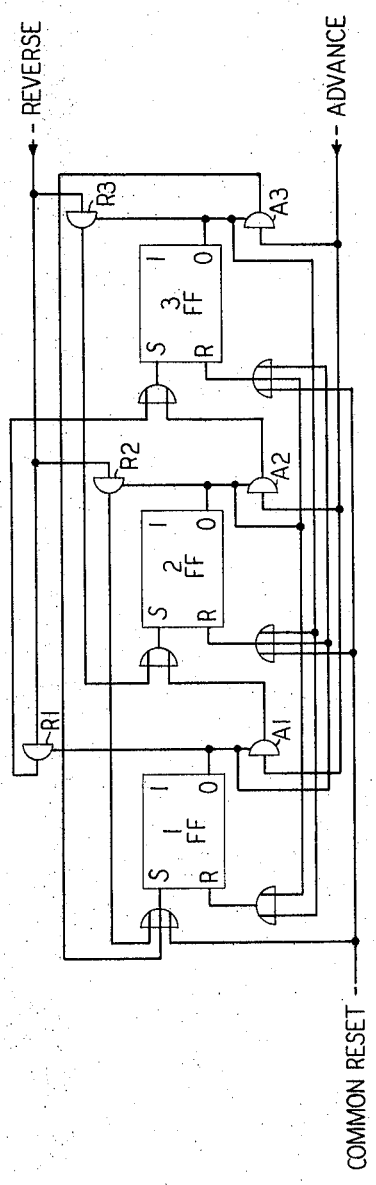

FIGS. 4A and 4B, 5A and 5B, 6A and 6B, and 7A and 7B are box and circuit diagrams of circuit elements usable in FIGS. 8 through 16;

FIGS. 8 through 16 are schematic circuits of specific embodiments of the transmitting and receiving apparatus shown in FIGS. 2 and 3 and utilizing the specific embodiment of the present invention;

FIG. 17 illustrates the arrangement for interconnecting the several circuits included in FIGS. 8 through 16;

FIG. 18 is a schematic circuit of a modulo 5 ring counter usable in FIG. 8;

FIG. 19 is a schematic circuit of a word counter usable in FIGS. 2, 3, 15 and 16; and FIGS. 20A and 20B, 21A and 21B, 22A and 22B, 23A and 23B, and 24 are box and circuit diagrams of additional circuit elements usable in FIGS. 8 through 16.

In the following description, it is to be noted that the same circuit elements appearing in the several figures of the drawing are identified with the same reference numerals.

Figure 1:
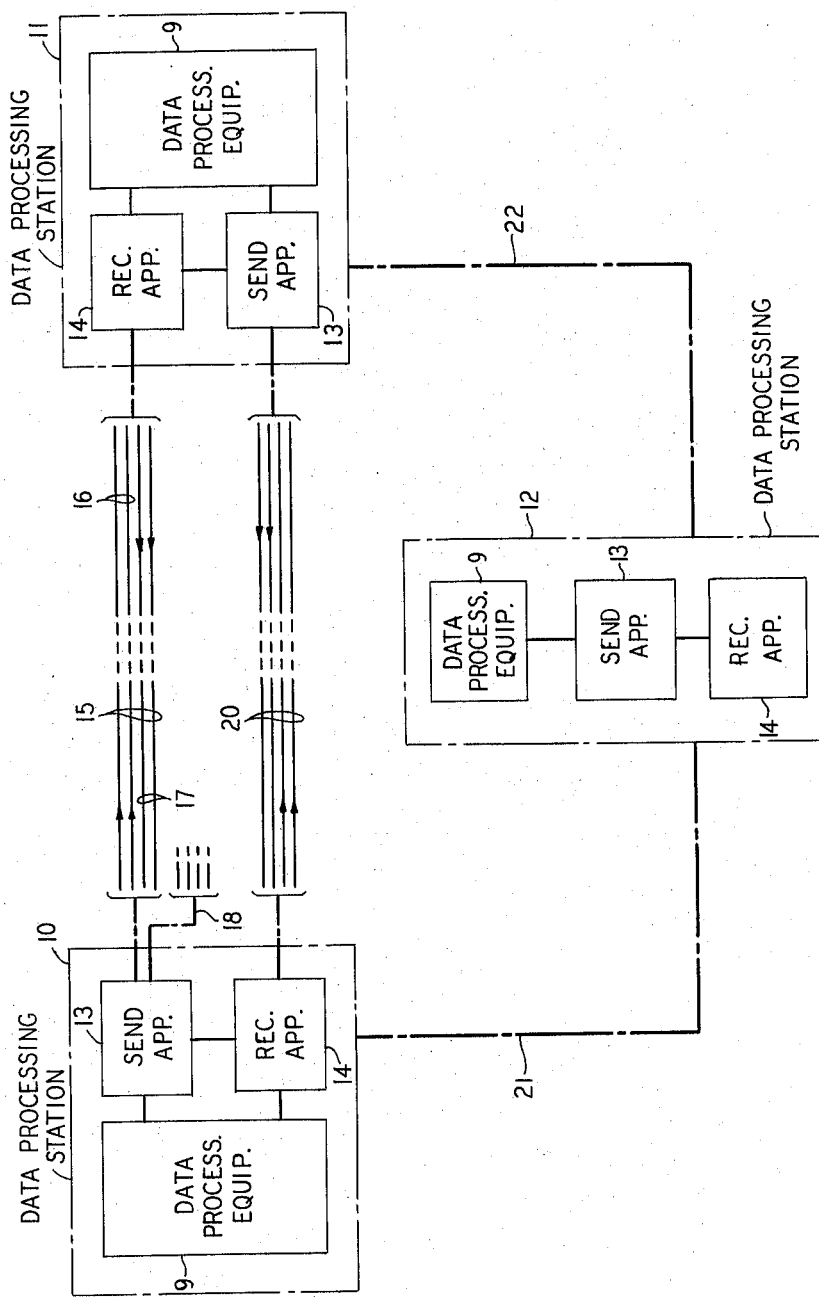
FIG. 1 is a box diagram of a data processing system including a plurality of interconnected data processing stations adapted for transmitting and receiving digital data messages.

Referring to FIG. 1, it is seen that an overall data processing system comprises, for example, data processing stations 10, 11 and 12, each including data processing equipment 9 connected to sending data apparatus 13 and receiving data apparatus 14. The data processing equipment 9 comprises a well-known type for sending and receiving digital data messages. The sending apparatus 13 at station 10 is connected to the receiving apparatus 14 at station 11 by a signaling trunk 15 comprising a first pair of leads 16 for transmitting the digital data messages from the sending apparatus to the receiving apparatus and a second pair of leads 17 for otherwise communicating between such sending and the receiving apparatus. For the purpose of the instant explanation, it is assumed that a ten-word text message is to be sent from station 10 on cable 15 to station 11, although a five-word text message may also be transmitted as later mentioned herein. Depending upon the amount of data traffic between stations 10 and 11 in the direction just mentioned, the signaling trunks may comprise two or more in number. For the present illustration, an additional signaling trunk 18, identical with trunk 15, is assumed to provide sufficient signaling facilities for handling the data traffic in the direction from station 10 to station 11. On the other hand, one trunk 20 identical with trunk 15 is assumed to be adequate for handling the data traffic in the direction from station 11 to station 10. Broken lines 21 and 22 represent a predetermined number of signaling trunks for interconnecting station 12 with stations 10 and 11, respectively, for handling the data traffic requirements in both directions therebetween. The signaling trunks comprise a frequency-shift type well known in the art, as mentioned hereinafter. The circuits constituting the respective sending and receiving apparatus included in each of stations 10, 11 and 12 are hereinafter described.

FIG. 2 indicates the general procedure for handling an outgoing message originating in the sending apparatus of station 10 and destined for the receiving apparatus in station 11 as previously assumed. Thus, the block diagram in FIG. 2 illustrates the sending apparatus 13 included in each of the data processing stations 10, 11 and 12. When the data processing equipment has a message to be transmitted, it applies a message-ready signal voltage via lead 25 to message slot availability detector 26, which is thereby activated to supply a testing voltage on lead 23 to write circuits 37. These circuits select an idle outgoing message slot in twistor memory 38 and thereby an outgoing trunk which is permanently associated with each such slot for reaching the destination station 11. Each outgoing message slot in the twistor memory includes a control word which is permanently provided therein for a purpose that is mentioned hereinafter and space for the ten text words of the message to be stored therein in a manner that is now briefly explained. After the idle outgoing trunk is selected, the slot detector 26 returns a send-message signal voltage on lead 27 to the data processing equipment.

On the other hand, if the slot detector tested and found all message slots of the twistor memory associated with trunks for reaching the desired destination station 11 were busy, the slot detector returns a do not send message signal voltage on lead 28 to the data processing equipment whereupon the message is not sent. If, in the next signaling cycle of the data processing equipment, this equipment has another message for a different message slot in the twistor memory and therefore for a different outgoing trunk connected thereto, it again sends a have-message signal voltage on lead 25 to the slot detector which is then activated to select a slot associated with the desired outgoing trunk in the twistor memory. At this time, it is assumed that outgoing trunks to other destination stations are idle. The transmission of this message via the last-mentioned slot is processed in the manner presently being described for the assumed instant message.

Returning to the send-message signal on lead 27, it follows that this signal activates the data processing equipment 9 in FIGS. 2 and 3 in such manner as to apply the first word of the ten-word text message to lead 29 at a microsecond speed. In this connection, it is understood that the lead 29 represents 22 discrete leads, each transmitting one binary digit of a text word assumed to comprise 22 binary digits. Thus, each text word comprises 22 "1" and "0" bits including a simple parity bit and arranged in a preselected order for simultaneous transfer in parallel via the 22 leads 29 to shift register 30 which is capable of ultimately storing a word of 27 bits including five modulo 5 parity bits as subsequently mentioned.

When the first 22-bit text word is accepted by the shift register, the word is subjected to two actions before it is transferred to its appropriate slot in the twistor memory. First, the accepted word is applied from the output of the shift register to the input of a simple parity checking circuit 31 and, if the parity check indicates incorrect parity, a repeat-word signal voltage is sent on lead 35 to the data equipment. This voltage activates the data processing equipment to repeat the faulty word before the next word is transmitted. This repetition is continued until the word is correctly transferred. Second, the 22-bit word is read out by text and modulo 5 parity bits read out gates 34 from the shift register a bit at a time to a modulo 5 encoder 36 wherein a modulo 5 parity checking code of 5 bits is encoded thereinto for facilitating a check of the accuracy of message transmission from the originating sending apparatus of station 10 to the receiving apparatus of the station 11 in a manner that is explained below.

Now, the first text word of the message comprises 27 bits as follows:

Message Bit   1 2 3 4 5 . . . 16 17 18 19 20 21 22
Modulo                                                             1 2 3 4 5

Assuming the word has been correctly transferred, the send next word or correct-parity signal is transmitted on lead 32 to the data equipment and on lead 33 to the read out gates 34 which transmit the 27 bits of the word in parallel at the same time to bit write circuit 37. These in turn transmit the 27 bits of the word in parallel at the same time to the previously selected outgoing slot in twistor memory 38, which is described hereinafter. In a similar manner, each word of the remaining nine words of the message are stored in the previously selected slot of the twistor memory. This outgoing slot includes therein a permanent control word comprising 27 bits arranged as follows: 100 . . . 0. The control word is positioned ahead of the ten text words of the message for a purpose which is further discussed below. It is thus apparent that each outgoing message slot of the twistor memory is capable of storing eleven words. In the following description, it is understood that when each word is transferred from the twistor memory into the shift register and therefrom back into the twistor memory, the 27 bits constituting each such word are transferred in parallel at the same time.

Under control of successive timing pulses provided by clock circuit 39 and control logic circuit 40 and word counter 42, the following action is effected in FIG. 2 for transmitting a ten-word message from data station 10 to data station 11. Read circuit 41 is activated to read out initially the entire 27-bit control word on lead 43 from the twistor memory back into the shift register; and thereafter the shift register is advanced to one stage. This serves to transmit the 0 bit from the No. 27 position and to rewrite it in the No. 1 position of the control word while the 1 bit is advanced to the No. 2 position. At this time, the control word comprises 27 bits arranged as follows: 010 . . . 0. This transmission of the 0 bit evoked no further action in the sending apparatus. This control word is read out of the shift register and rewritten back on lead 44 into the first position of the message slot of the twistor memory; and the shift register is reset, preparatory to the acceptance of the first text word of the message. This indicates that sending apparatus shown in FIGS. 1 and 2 is ready to transmit the first bit of the first text word of the message to the receiving apparatus shown in FIGS. 1 and 3.

Next, assuming the word counter is adjusted to the first word of the message, the 27 bits comprising the first text word being transferred are read out of the twistor memory and written back into the shift register on lead 43, and thereafter the shift register is advanced to one stage. During this shift, the 27th bit, which may be a 1 or a 0, constituting the first bit of the first text word is transmitted over lead 45, outgoing trunk circuit 46, modem 47, and outgoing trunk 15 to the receiving apparatus of data station 11 which accepts the transmitted bit as the desired destination of the message in question. The trunk circuit and modem constitute a frequency-shift transmission circuit well known in the telegraph art. At the same time, the transmitted first bit is shifted into the No. 1 position of the 27-bit first text word while each of the remaining 26 bits are shifted one position thereafter. This word as presently formed is then rewritten into the twistor memory on lead 44, and the shift register is reset in anticipation of the transfer of the next word thereto. Thus far, the first bit of the first text word of the message has been transmitted to data station 11.

Again, the control word is read out of the twistor memory and written into the shift register, and the latter is advanced one stage. This transmits a 0 bit from the No. 27 position of the control word and rewrites it in the No. 1 position thereof while each of the remaining 26 bits are shifted one position thereafter. At this time, the control word comprises 27 bits arranged as follows: 001 . . . 0. This transmission of the 0 bit stimulated no additional action in the sending apparatus. This control word is read out of the shift register and written back into the first position of the message slot in question, and the shift register reset in preparation to the acceptance again of the first text word of the message. This indicates that the sending apparatus of station 10 shown in FIGS. 1 and 2 is ready to transmit the second bit of the first text word of the message to station 11.

Next, the 27-bit first text word of the message is read out of the twistor memory and written back into the shift register, and thereafter the latter is advanced one stage. Again, the 27th bit, which may be a 1 or a 0, constituting the second bit of the first text word is transmitted over lead 45, outgoing trunk circuit 46, modem 47, and outgoing trunk 15 to the receiving apparatus at data station 11. At the same time, the transmitted second bit is shifted to the No. 1 position of the 27-bit first text word, while each of the remaining 26 bits are shifted one position thereafter. This word as presently formed is written into the twistor memory and the shift register is reset, in preparation for the transfer of the next word thereinto. At this point, the second bit of the first text word of the message has been transmitted to data station 11.

The foregoing procedure is repeated until the 1 bit attains the No. 27 position in the control word whereupon the end of the transmission of the first word is indicated. The control word now comprises the 27 bits arranged as follows: 000 . . . 1. At this point, the 26th bit of the first text word has been transmitted to data station 11 so that the 27th and final bit of this word occupies the 27th bit position therein. Again, the control word is read out of the twistor memory and written into the shift register which is thereupon advanced one stage. This transmits the one bit of the control word into the word counter which is thereby adjusted for reading out the second text word of the message; and at the same time the 1 bit is re-written back into the No. 1 position of the control word in preparation for the transmission of the 27 bits of the second text word of the message to data station 11. At this time, the control word comprises 27 bits arranged as follows: 100 . . . 0; and it is read back into the twistor memory. Thereafter, the shift register is reset.

Next, the first text word is read out of the twistor memory and written into the shift register, and the latter is advanced one stage. Again, the 27th bit, which may be a 1 or a 0, constituting the final bit of the first text word is transmitted to station 11. At the same time, this 27th bit is shifted into the No. 1 position of the first text word. This word is read back into the twistor memory, and the shift register is reset. The first text word is now fully transferred to the receiving apparatus of station 11, and it is also held in the twistor memory of the sending apparatus in station 10 until the receiving apparatus at station 11 no longer requires a retransmission of the first text word, as indicated hereinafter.

In the event an error occurs in the first text word as received in the receiving apparatus of data station 11, a suitable signal is returned therefrom to the sending apparatus of data station 10 to retransmit the first text word. This is repeated until the text word is properly received at data station 11 Assuming the first text word is properly transferred the receiving apparatus of station 11 returns no signal to the sending apparatus at data station 10, as mentioned hereinafter. Since this word is no longer needed, it is erased from the sending twistor memory. In this connection, it is understood that the word counter is advanced to read the second word of the message in question, as previously mentioned. In a similar manner, the remaining nine words of the message are transmitted from the sending apparatus 13 of station 10 to the receiving apparatus 14 of station 11 as shown in FIGS. 1 and 2. Upon the transmission of the 27th bit of the tenth and final word of the message in question, it is understood that the word counter is recycled in preparation for the transmission of the first word of the next message stored in the same twister memory slot. The five words of a short message are transmitted in accordance with the foregoing procedure, except the word counter is recycled at the end of the fifth word.

The progress of the 1 bit in the 27-bit control word for transmitting each bit of each 27-bit text word is indicated below:

TABLE A

| 27 BIT CONTROL WORD IN TWISTOR MEMORY | | | | | | | TEXT WORD BIT REC. OR TRANS. |
|---|---|---|---|---|---|---|---|
| BIT POSITION | 1 | 2 | 3 | 25 | 26 | 27 | |
| CONTROL WORD BITS | 1 | 0 | 0 | 0 | 0 | 0 | 27 |
| | 0 | 1 | 0 | 0 | 0 | 0 | 1 |
| | 0 | 0 | 1 | 0 | 0 | 0 | 2 |
| | | | | | | | |
| | 0 | 0 | 0 | 0 | 1 | 0 | 25 |
| | 0 | 0 | 0 | 0 | 0 | 1 | 26 |
| | 1 | 0 | 0 | 0 | 0 | 0 | 27 |

The foregoing describes the transmission of the text words of one complete message stored in one outgoing message slot of the twistor memory. For that purpose, it is understood that the clock circuit and control logic circuit provide a complete cycle of operation comprising a message transfer interval followed by a bit-transmission interval. During the message transfer interval, the 22 bits comprising, for example, each complete word of the message are transferred in parallel from the data processing equipment to the twistor memory until the complete message of five or ten words is stored in the corresponding outgoing message slot thereof, while during the bit-transmission interval one bit of each word of the message, commencing with the first word and terminating with the last, is transmitted at a given time.

When two or more messages are stored in corresponding outgoing message slots of the twistor memory, it is further understood that the clock circuit and control logic circuit provide a message transfer interval in which the 22 bits of each text word of each message are simultaneously transferred in parallel from the data processing equipment to the twistor memory until each complete message is stored in the proper outgoing twistor memory slot and a bit-transmission interval for each bit of each text word of each message; and that in the latter interval, one bit of one word of each message is transmitted in turn before the procedure is repeated to transmit in turn the next succeeding bit of the same word of each message. This procedure is continuously repeated for all words of all messages so that discrete messages may be continuously added to and transmitted from the respective outgoing slots of the twistor memory in the manner previously explained.

Referring now to FIG. 3, there is indicated therein the procedure for handling a message incoming to the receiving apparatus 14 of any station and originating in the sending apparatus 13 of any of the stations shown in FIG. 1. Since certain equipments at each station are utilized in both the sending and receiving procedures thereat, the receiving apparatus 14 shown in FIG. 3 is described with reference to station 10. However, it is to be understood that such description would apply equally as well to the receiving apparatus at stations 11 and 12 in FIG. 1. For this purpose it is assumed that the afore-described message on outgoing trunk 15 in FIG. 2 is now being transmitted on incoming trunk 20 in FIG. 3. It is therefore evident that the receiving apparatus 14 shown in FIG. 3 is included in each of data stations 10, 11 and 12.

As the bits of each text word of the ten-word message just transmitted are received one at a time, each such bit incoming on trunk 20, modem 51 and incoming trunk circuit 52 is written by write circuit 37 into the corresponding message slot in twistor memory 38 and read out therefrom by the read circuit 41 into the shift register 30 under control of successive timing pulses provided by clock circuit 54, control logic 55 and incoming trunk scanner 56. The ten text words of the message as received are stored one at a time on a bit-by-bit basis in the corresponding message slot behind a control word, in the manner hereinbefore mentioned regarding message storage in the twistor memory at the sending apparatus. The message as stored comprises a control word and ten text words, or eleven words in all. The control word comprises 27 bits including a single 1 bit and twenty-six 0 bits arranged in the form of 100 . . . 0 to be identical with the control word used in the transmitting apparatus hereinbefore discussed regarding FIG. 2.

The purpose of the control word in regard to incoming messages in FIG. 3 is to direct the writing of the incoming bits thereof into their proper bit and word slots in the same associated receiving twistor memory. Assuming the first bit of the first word of the message in question is to be received and the 1 bit occupies the No. 27 position in the control word in the twistor memory as indicated in Table A, above, it is apparent from the foregoing description regarding the sending apparatus that the 27th bit of the next previous word has been transmitted. This means that when the 1 bit was changed from the No. 27 position in the control word to the No. 1 position therein in the shift register to effect the transmission of the 27th bit of the next previous word, the word counter is assumed to have been adjusted by such change of the 1 bit in the control word to the first word of the next following message, as previously mentioned herein.

In preparation for the reception of the first bit of the first word of the next following incoming message in FIG. 3, the 27-bit control word with the 1 bit in the No. 1 position thereof as just mentioned is read out of the twistor memory and written via lead 48 into the shift register which is thereupon advanced one stage. This transmits the 0 bit in the No. 27 position of the control word and inserts the 0 bit in the No. 1 position while the 1 bit is moved to the No. 2 position. Now, the control word comprises the 27 bits arranged as follows: 010 . . . 0. This change in the control word effects no action in the receiving apparatus at this time. The control word is now read out of the shift register and written back into the twistor memory; and the shift register is reset. At this time, the first bit of the first text word of the transmitted message in quesion is written into the No. 1 position of such word in the twistor memory. Actually, the first bit received is the 27th bit of the first text word as now stored in the sending twistor memory.

The control word having the 1 bit in the No. 2 position is read out of the twistor memory and written back into shift register which is thereupon advanced one stage. This transmits the 0 bit from the No. 27 position of the control word and inserts the 0 bit in the No. 1 position while the 1 bit is moved to the No. 3 position. The 27-bit control word is now written: 001 . . . 0. This evokes no further action in the sending apparatus at the moment. Then, the control word is written back into the twistor memory. The second bit of the first text word of the message in question is written into the No. 2 position of such word in the twistor memory and the shift register is reset. Actually, this second bit as stored in the receiving twistor memory is the second last bit of the first text word as now stored in the sending twistor memory.

The foregoing procedure is repeated until the 1 bit occupies the No. 27 position in the control word whereby the end of the reception of the transmitted first text word is indicated. The control word now comprises the 27 bits arranged as follows: 000 . . . 1. Up to this time, the 26th bit of the transmitted first text word has been received so that the 27th and final bit of this word occupies the 27th bit position therein. Again, the control word is read out of the twistor memory into the shift register which is advanced one stage. This transmits the 1 bit from the No. 27 position of the control word into the word counter which is thereby adjusted for receiving the second text word of the transmitted message; and at the same time, the 1 bit is inserted into the No. 1 position in the control word which comprises the 27 bits arranged as follows: 100 . . . 0. The control word is read out of the shift register into the twistor memory; and the shift register is reset. At this time, the 27th and final bit of the transmitted first text word is stored in the No. 27 position in the received first text word in the twistor memory.

In a similar manner, the remaining nine words of the message transmitted from the sending apparatus of station 11 are received and stored in the twistor memory of the receiving apparatus of station 10 shown in FIGS. 1, 2 and 3. Upon the reception of the 27th bit of the tenth and final word of the message in question, it is understood that the word counter is recycled, preparatory to the reception of the first word of the next message in the same twistor memory slot. The five words of a short message are transmitted in accordance with the foregoing procedure, except the word counter is recycled at its 6 position. Again, the progress of the 1 bit in the 27-bit control word for receiving each bit of each 27-bit text word is indicated in Table A mentioned above.

As soon as the first text word is stored in the twistor memory, it is read out on lead 49 to the modulo 5 parity decoder 57 in which the 5-parity bits inserted at the sending apparatus are checked out. If these bits check out satisfactorily, an OK signal voltage is transmitted from the parity decoder on lead 58 to the write circuit 37 whereupon the first text word of the original 22 bits is written back from the modulo 5 parity decoder on lead 58 into the twistor store. At this time, the modulo 5 parity checking code is removed from the first text word. Since the first text word was correctly stored in the receiving twistor memory, no communication from receiving station to the sending station is required to erase this word from the twistor memory in the sending station, as previously mentioned.

On the other hand, when a received word fails to check out satisfactorily in the receiving station in the foregoing respect, a no-good signal is returned on signaling trunk 20 to the sending station for the purpose of requesting the latter station to repeat a transmission of the error word. This is done at the end of the next following word so as not to interfere with transmission thereof. At the completion of the transmission of such next following word, the receiving twistor memory 38 erases the word in error and the next succeeding word thereafter. At the same time, the no-good signal stimulates the sending apparatus 13 at the sending data station to begin the transmission of the word in error and the succeeding word thereafter a second time. The erasure of the word in error and the next-succeeding word thereafter is necessitated by the fact that the receiving twistor memory is unable to recognize otherwise the postion of such next succeeding word in the text of the message. The remaining text words of the message are received and processed by the parity decoder 57 in the receiving apparatus 13 located in the receiving data station in accordance with the foregoing procedure.

When all text words of the message are received and satisfactorily stored in the twistor memory 38 in the receiving data station, the read circuit 41 recognizing the message is available for transfer to the data processing equipment 9 activates the twistor memory to read out the first text word. These 22 bits of the encoded first word are simultaneously transmitted through the shift register into the data processing equipment which returns an OK signal on lead 62 for correct parity or a no-good signal on lead 61 for incorrect parity.

Assuming the simple parity check of the first text word as received in the data processing equipment was correct, the OK signal on lead 62 activates the read access circuits which stimulate the twistor memory to read out the second text word. The encoded second word of 22 bits is read into the shift register from which the 22 bits are simultaneously transferred into the data processing equipment. Assuming the simple parity of the second word is correct, the data processing equipment returns the OK signal on lead 62 to actuate the read out circuits for reading out the third text word from the twistor memory into the receiving data equipment. This procedure continues until all text words of the message stored in the twistor memory in FIG. 3 are read out in a similar manner into the data processing equipment.

Assuming, now, the data processing equipment returns a no-good signal on lead 61, this signal activates the read circuit to read out the word in error once again from the twistor memory. This procedure is continued until the receiving data equipment returns an OK signal on lead 62 whereupon the repetition of the reading of the word in error is terminated.

*System elements.*—This description relates to element symbols and equivalent circuitry utilized in the several figures of the drawing.

Figure 4A:
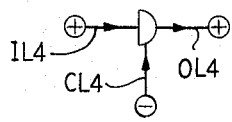
Figure 4B:
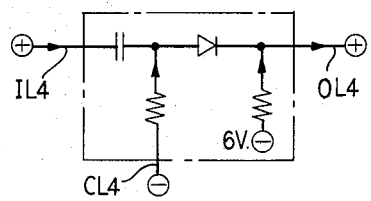

*Enabling gate.*—An enabling transmission AND gate shown in FIG. 4A demonstrates an enabling gate whose equivalent circuitry is delineated in FIG. 4B. The potentials indicated are assumed relative to ground. When a —24 volt potential is effective on control lead CL4, the gate is nonconductive so as to block the transmission of a positive voltage pulse up to 18-volts amplitude effective on incoming lead IL4. When the potential of the control lead is at —8 volts, the gate is rendered conductive so as to permit the positive voltage pulse in excess of 2 volts say, for example, 16 volts to be transmitted therethrough to output lead OL4.

Figure 5A:
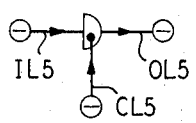
Figure 5B:
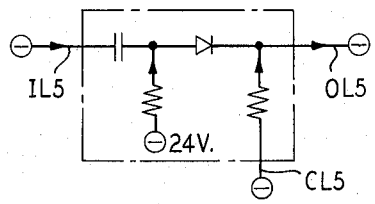

*Inhibiting gate.*—An inhibiting AND gate illustrated in FIGS. 5A and 5B is normally conductive for a positive-going input pulse, in excess of 2 volts say, for example, 16 volts applied to its input lead IL5, when a negative voltage in excess of —24 volts is applied at the same time to its control lead CL5, whereby the input positive voltage pulse is passed, is transmitted through the gate to output lead OL5. This gate inhibits the transmission of such positive pulse when control lead CL5 has a —8 volt potential applied thereto.

Figure 6A:
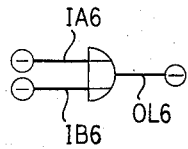
Figure 6B:
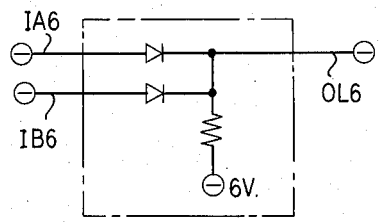

*OR gate.*—An OR gate is delineated in a typical manner in FIGS. 6A and 6B. When —24 volt potentials are simultaneously effective on both input leads 1A6 and 1B6, output lead OL6 effects substantially a —24 volt potential. On the other hand, if one or more of the input leads transmits a —8 volt potential, the output lead OL6 transmits a similar —8 volt potential. It is understood that while the gate is shown with two input leads, it may include three or more of such leads.

Figure 7A:
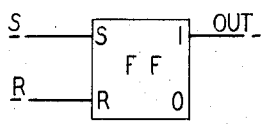
Figure 7B:
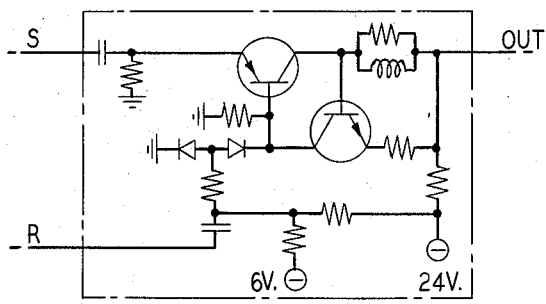

*Flip-flop.*—A flip-flop of a typical type illustrated in FIGS. 7A and 7B comprises essentially two gates connected back to back, that is, the collector output of one feeds the base of the other while the collector output of the other feeds the base of the one. In FIG. 7A, lead S provides a set voltage while lead R provides a reset voltage, and the output potential is effective on lead OUT. An equivalent circuit for FIG. 7A is illustrated in FIG. 7B. The latter circuit is essentially a bistable type which, in its reset state, provides a —24 volt potential on its 1-side output lead OUT and which in its set state supplies a —8 volt potential on its 1-side output lead OUT. A positive-going input signal voltage on input lead S in excess of approximately 6 volts sets the flip-flop while a positive-going signal voltage on input lead R in excess of 9 volts resets the flip-flop.

*Ring counter.*—This, shown in FIG. 18, is a conventional 6-stage ring counter comprising six flip-flops 0 through 5. In the idle or starting position, the 0 flip-flop is in the set or "on" state while stages 1 through 5 are in the reset or "off" state. Under this condition, the output of the 1-side of the 0 flip-flop provdes approximately a —8 volt potential on lead 110 while the 1-side outputs of the remaining flip-flops 1, 2, 3, 4 and 5 provide approximately a —24 volt potential on leads 111, 112, 112a, 112b and 113, respectively. This —8 volt potential from the 1-side output of the 0 flip-flop primes gate 114. Thus gate 114 is in the enabled condition and gates 115, 116, 116a, 116b and 117 are in the inhibited condition. Assuming at the moment, a positive-going input pulse in excess of 8 volts, but less than 24 volts, is applied to lead 118, then such pulse is transmitted through gate 114 to the set input of the 1 flip-flop thereby setting it. This changes the effective voltage on lead 111 from —24 volts to —8 volts which primes gate 115 and resets the 0 flip-flop.

Additional positive-going pulses on lead 118 sets the 2, 3, 4 and 5 flip-flops in turn and resets the preceding one. This changes the effective potentials on leads 112, 112a, 112b and 113 from —24 volts to —8 volts in turn. With the 5 flip-flop set, gate 117 primed, and the preceding flip-flops reset, the next positive input pulse on lead 118 transmitted through gate 117 sets the 0 flip-flop. The —8 volt potential in the 1-side output of the 0 flip-flop effective on lead 110 as previously mentioned is also applied to the reset input of the 5 flip-flop which is thereby activated to the reset state. The ring counter is thus recycled.

*AND gate.*—This, shown in FIGS. 20A and 20B, is activated only by the coincidence of positive signal voltages on input leads 1A7 and 1B7, and is thereby caused to provide a positive output voltage on output lead OL7.

*Inverter.*—This delineated in FIGS. 21A and 21B performs the single function of reversing the polarity of an input voltage thereto.

*Binary counter.*—This, illustrated in FIGS. 22A and 22B, comprises a single input and changes its state for each such input, and includes a flip-flop and two AND gates. This operates in the conventional manner.

*Amplifier.*—This, shown in FIGS. 23A and 23B, comprises a conventional common-emitter type, as one example, and includes an input lead IL1 and an output lead OL1.

*Word counter.*—This shown in FIGS. 2, 3, 15, 16 and 19 is essentially a reversible ring counter of a type illustrated more completely in FIG. 19 for counting the discrete words of each message during its transmission or reception. The counter comprises a familiar combination of flip-flops, AND gates, and OR gates for providing ten counting stages (three of which are shown in FIG. 19), and is advanced one stage for each word correctly transmitted or received, but is decremented one stage for each word incorrectly transmitted or received. The operation of the ring counter is briefly mentioned here, although it is further discussed hereinafter in connection with the operation of the word counter 42 in the transmission of ten-word and/or five-word outgoing messages from the twistor memory 38 in FIG. 15 and the recording of incoming messages in the twistor store 38 in FIG. 16. The general operation of the ring counter in FIG. 19 for a ten-word message is as follows: A common reset pulse, when the system is initially activated resets all stages but the first which is set. An advance pulse accepted by gate A1 sets flip-flop 2 which resets flip-flop 1. A reverse pulse accepted by gate R2 sets flip-flop 1 which resets flip-flop 2 to decrement one count. The forward operation for a count of ten continues until the last stage is reached whereupon an advance pulse sets flip-flop 1 and the counter is recycled for another count of ten words. On the other hand, the counter may be recycled at the count of six for a five-word message.

*Comparator.*—This shown in FIGS. 24A and 24B comprises two pairs of input AND gates IN and a pair of output OR gates OUT. It provides a —8 volt potential on output lead OL1 only when —8 volt potentials are simultaneously applied to both input leads IL1 and IL2, or a −24 volt potential on output lead OL1 when the potentials on the input leads IL1 and IL2 are different. Thus, a −24 volt potential is provided on output lead OL1 when a −8 potential is effective on input lead IL1 and a −24 volt potential on input lead IL2, or vice versa.

DETAILED DESCRIPTION OF THE SYSTEM

Figure 9:
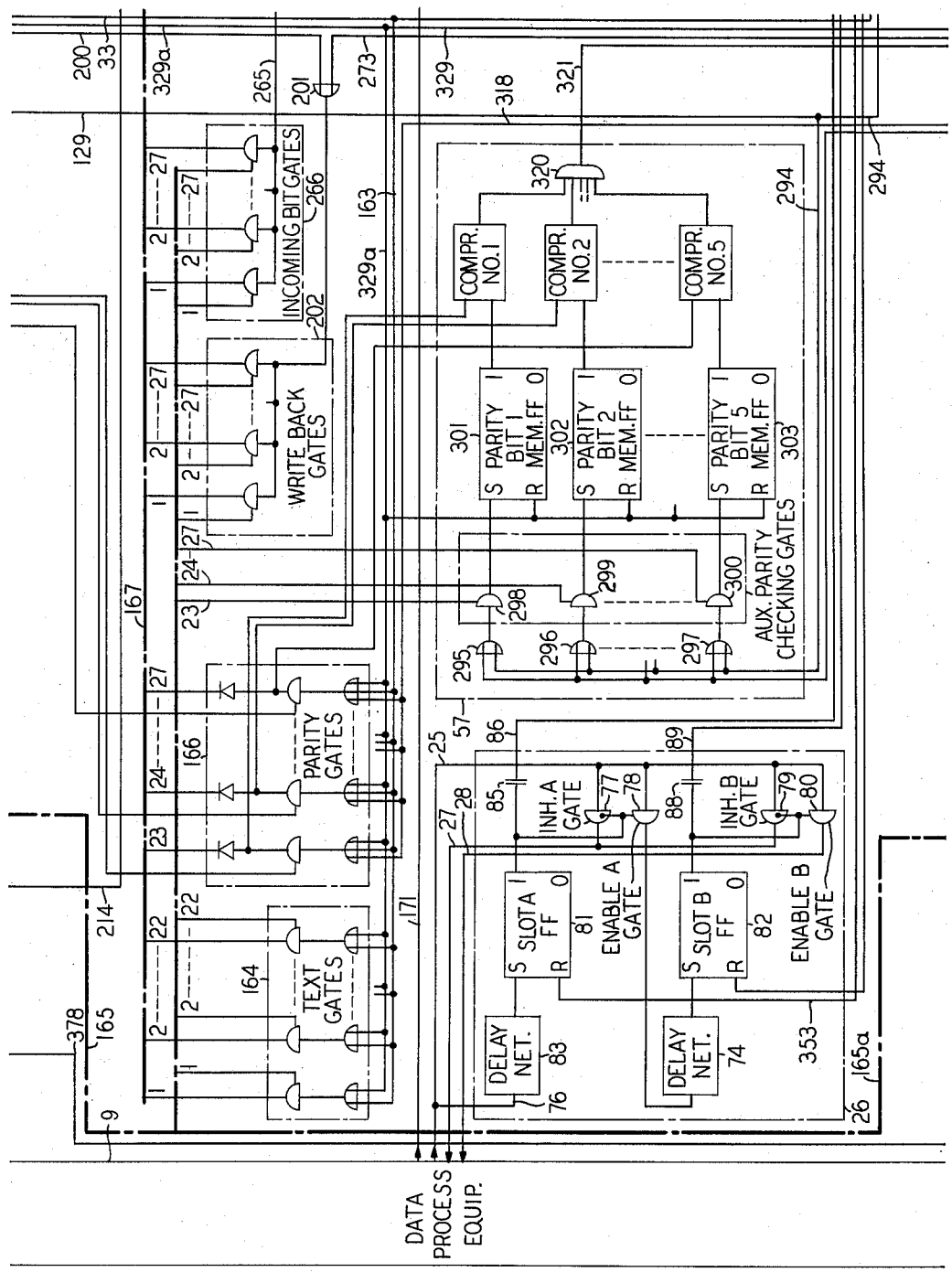

*Message slot availability detector.*—When the data processing equipment 9 at sending data station 10 in FIGS. 1 and 9 indicates a message is ready for a specific destination say, for example, receiving data station 11 in FIG. 1 as hereinbefore assumed, it supplies simultaneously a portion of a positive voltage on lead 25 to the input of gates 77, 78, 79 and 80 included in a message slot availability detector 26 shown in FIGS. 2 and 9. Gates 77 and 79 are the inhibiting type while 78 and 80 are the enabling type, as hereinbefore explained. At this time, slots-A and B flip-flops 81 and 82, respectively, are in the reset state whereby negative voltages effective at the outputs of their 1-sides are also applied to the inputs of the pairs of gates 77 and 78 and 79 and 80.

At the same time the positive voltage on lead 25 is also applied via lead 76 and delay network 83 to the set input of slot-A flip-flop 81. No action is effected at the moment in regard to the functioning of this flip-flop because of the operation of the delay network. Since flip-flops 81 and 82 are in the reset states, their 1-side outputs provide −24 volt potentials to the control leads of the gates 77 and 78 and 79 and 80. As a consequence, the positive voltage supplied on lead 25 to the input of inhibiting gate 77 is passed therethrough and thereafter transmitted as a send message signal on lead 27 to the data equipment 9 for a purpose that is presently mentioned. In due course, slot-A flip-flop 81 is set to supply −8 volt potential from its 1-side output to the nearest plate of capacitor 85. The other plate of this capacitor supplies effectively a positive voltage of approximately 8 volts to lead 86 and thereby to the set input of slot-A write-in flip-flop 87 in FIG. 12. This flip-flop is set for a purpose that is hereinafter described.

Figure 15:
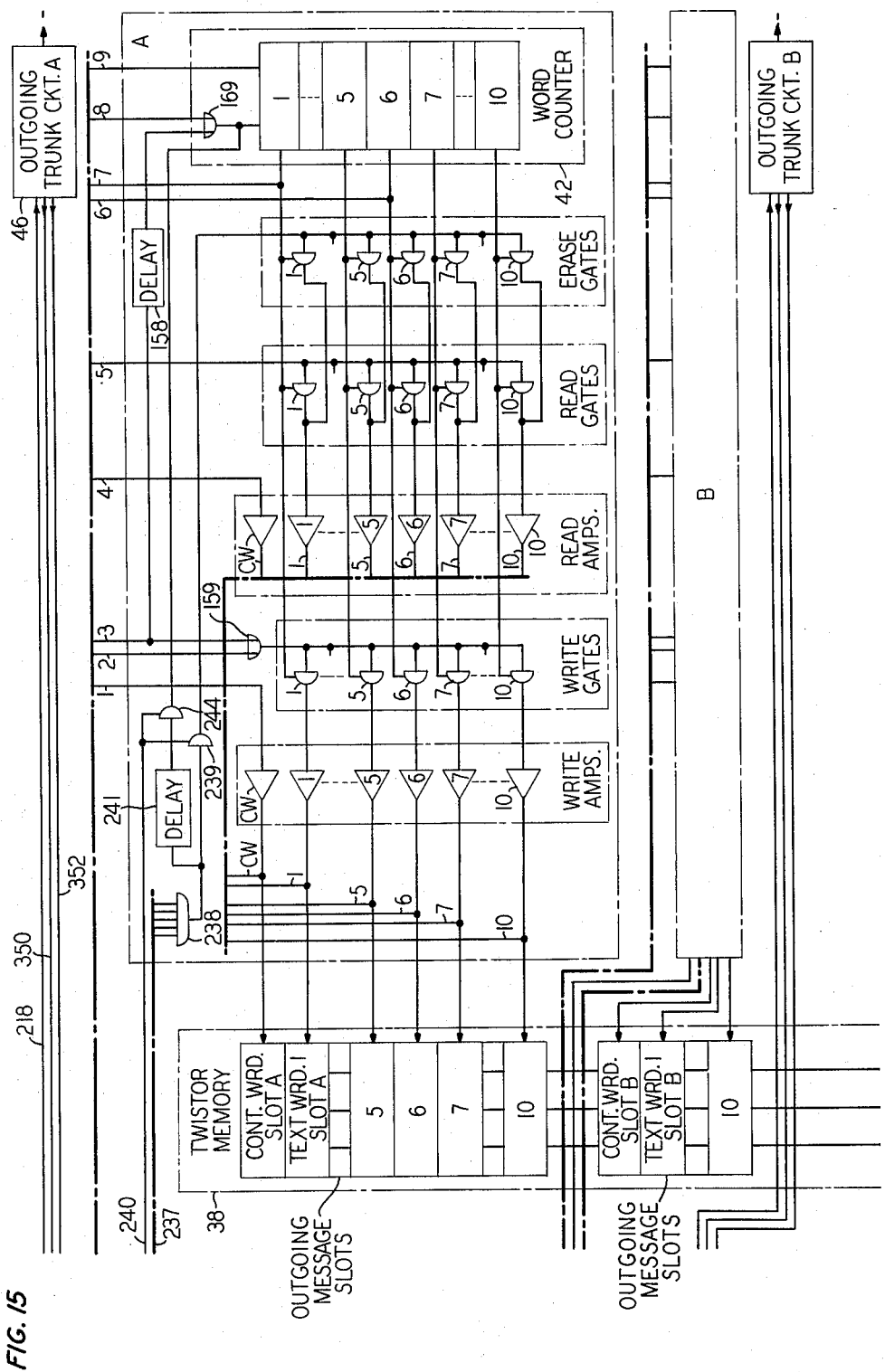

As slot A of twistor memory 38 shown in FIGS. 2 and 15 is assumed to be idle at this time, the message to be transmitted can be stored therein. If, however, slot A in the twistor memory were busy, then the slot-A flip-flop 81 in FIG. 9 would be resting at this time in the set state whereby the output of its 1-side would supply the −8 volt potential to inhibiting gate 77. This gate would therefore not pass the positive voltage supplied thereto on lead 25. This positive voltage would, however, be accepted by and passed through enabling gate 78 which is also receiving −8 volt potential from the 1-side output of set flip-flop 81. The positive voltage in the output of enabling gate 78 is applied through delay network 74 to the set input of slot-B flip-flop 82.

At the moment slot-B flip-flop 82 in FIG. 9 is lying in the reset state whereby a negative voltage of −24 volts is supplied from the output of its 1-side to the inputs of inhibiting gate 79 and enabling gate 80. Before slot-B flip-flop 82 is set, inhibiting gate 79 passes the positive voltage on lead 25 therethrough as a send message signal on lead 27 to the data equipment 9. In due course, slot-B flip-flop 82 is set whereby its 1-side output supplies a −8 volt potential to the inputs of both gates 79 and 80 to block inhibiting gate 79 but to open enabling gate 80 to the positive voltage pulses incoming thereto on lead 25 for a purpose that is subsequently mentioned. This −8 volt potential is also applied to the nearest plate of capacitor 88 whose other plate provides effectively a positive voltage. This voltage is then supplied on lead 89 to slot-B supervisory circuits which are identical with those shown for slot-A in FIG. 12. In the event both slots-A and B flip-flops were busy indicating that no outgoing trunks to the desired destination were available at this time, the positive voltage on lead 25 would be accepted by enabled gate 80, and returned as a do not send message signal on lead 28 to data equipment 9. In this case, data equipment 9 would very likely indicate that a message to a different destination is ready for transfer since an idle outgoing trunk to such destination is very likely available. If no other message were ready for transfer at the moment, the data equipment 9 would be instructed to wait one message holding time and then resubmit the message for which no outgoing trunks were originally available.

*Word size shift register.*—Each message in FIG. 8 is transferred from the data processing equipment 9 in such parallel-serial manner that the 22 bits constituting each text word of the message are simultaneously transferred in parallel from or to the data equipment while the text words are serially transferred one after the other. Although it is mentioned that 22 bits constitute one text word and five or ten words constitute a message, it is apparent that fewer or more bits per word and fewer or more words per message may be used, depending upon particular data processing systems.

When the data equipment 9 received the send message signal on lead 27 in FIGS. 2 and 9 as above mentioned, it was thereby activated to transmit the 1 through 22 bits of the first text word of the message in parallel at the same time to the inputs of the 1 through 22 OR gates 100, one gate for each bit, and thereby to the set inputs of the corresponding 1 through 22 flip-flops constituting word size shift register 30. In the idle state of the shift register, all flip-flops are in the reset state. This shift register includes five additional flip-flops 23 through 27 for accommodating 5 modulo bits for a purpose that is hereinafter explained, and is of a conventional type which, in one example, is disclosed in the copending application of Burdett-Davey-Harty-Ostendorf, Serial No. 729,717, filed April 21, 1958.

The negative-going signals representing the "0" bits fail to stimulate any action in the corresponding flip-flops whereby such flip-flops are permitted to remain in the reset state for providing −24 volt potentials at the 1-side outputs thereof while the positive-going potentials representing the "1" bits activate the corresponding flip-flops to the set state for producing −8 volt potentials at the 1-side outputs thereof. As a consequence, all reset flip-flops of the shift register represent the "0" bits of the first text word transferred thereto from the data equipment, whereas all set flip-flops represent the "1" bits of such word in the shift register.

*Modulo 5 ring counter.*—As shown in FIGS. 8 and 18, the −8 volt potential effective on lead 110 from the 1-side output of the 0 flip-flop in the set state in the modulo ring counter 103 for the reason later mentioned is applied to the reset input of control modulo flip-flop 125, the input of AND gate 126, the set input of read parity flip-flop 127, and the input of inhibiting gate 128 for a purpose that is later mentioned. The −24 volt potentials in the outputs of the modulo 1, 2, 3, 4 and 5 flip-flops are applied on leads 111, 112, 112a, 112b, and 113, respectively, to the inputs of enabling AND gates 105, 107, 107a, 107b and 109, respectively. The output of gate 105 on lead 104 is connected to the inputs of the 1 through 5 enabling AND gates 102 whose enabling inputs are obtained from the 1-side outputs of any of the 1 through 5 shift register flip-flops, respectively, that are in the set state.

The output of gate 107 on lead 112a is connected to the inputs of the 6 through 10 enabling AND gates 102 whose enabling inputs are received from the 1-side outputs of any of the 6 through 10 shift register flip-flops, respectively, that are in the set state. In like manner, the outputs of additional 3 and 4 modulo flip-flops in FIG. 18 but not shown in FIG. 8 are connected to the inputs of the 11 through 15 and 16 through 20 enabling AND gates 102, respectively, not shown, whose enabling inputs are received from the 1-side outputs of any of the 11 through 15 and 16 through 20 shift register flip-flops, respectively, that are in the set state. Finally, the output of gate 109 is connected via lead 108 to the inputs of the 21 and 22 enabling AND gates 102 whose enabling inputs are obtained from the 1-side outputs of any of the 21 and 22 shift register flip-flops that are in the set state. In this connection, it is obvious that the —24 volt potentials in the 1-side outputs of any of the 1 through 24 flip-flops in set state would block transmission through the corresponding gates 102.

As soon as a word is transferred from the data equipment to the shift register in FIG. 8, a —24 volt potential transmitted on word sent lead 90 is applied to one input of OR gate 91. As a consequence, OR gate 91 transmits a —24 volt potential to the set input of flip-flop 125 which is thereby activated to the set state. At the output of its 1-side, this flip-flop provides a —8 volt potential which primes control modulo enabling AND gate 130, as well as gates 105, 107, 107a, 107b and 109. Now, the first output voltage pulse of a 2-megacycle timing generator 131 transmitted through gate 130 and effective on lead 118 is applied to the input of enabling AND gate 117 in FIG. 18, enabled by the 1-side output of the set 5 flip-flop of the modulo ring counter 103 in FIGS. 8 and 18. The output of gate 117 activates the 0 flip-flop to the set state.

The —8 volt potential effective at the 1-side output of the set 0 flip-flop activates the 5 flip-flop to the reset state, primes the associated gate 114, and is applied on lead 110 to the reset input of control modulo flip-flop 125 and gates 126 and 128. The next voltage pulse transmitted on lead 118 from timing generator 131 and accepted by gate 114 in FIG. 18 activates the 1-flip-flop to the set state. The —8 volt potential in the 1-side output of the set 1-flip-flop resets the 0 flip-flop and is accepted by primed gate 105 in FIG. 8 and passed on lead 104 to the inputs of the 1 through 5 word gates 102. Similarly, succeeding voltage impulses on lead 118 set and reset the 2 through 5 flip-flops of the ring counter in turn to apply discrete —8 volt potentials via their associated 4 primed gates 107, 107a, 107b and 109 to the 6 through 22 word gates 102, as previously mentioned.

As hereinbefore explained, individual gates of the 1 through 22 word gates 102 are primed if "1" bits were transferred via the associated set flip-flop in the shift register but not primed if a "0" bit were transferred via the associated reset flip-flop in the shift register. The outputs of the 1, 6, 11, 16 and 21 word gates 102 are supplied to the input of OR gate 132; the outputs of the 2, 7, 12, 17 and 22 word gates 102 are supplied to the input of OR gate 133; the outputs of the 3, 8, 13 and 18 and the 4, 9, 14 and 19 word gates 102, not shown, are applied to respective other OR gates, not shown; and the outputs of the 5, 10, 15 and 20 word gates 102 are applied to the input of OR gate 134.

Thus, when the 1 flip-flop of the modulo ring counter is activated to the set state and when any one or all of the 1, 2, 3, 4 or 5 flip-flops of the shift register is also activated to the set state for indicating the transfer of a "1" bit, the 1, 2, 3, 4 or 5 gate of the 1 through 22 word gates 102 transmits a —8 volt pulse through each of the five associated OR gates 132 through 134. On the other hand when the 1 flip-flop of the modula ring counter is in the set state and when any one or all of the 1, 2, 3, 4 or 5 flip-flops of the shift register remain in the reset state for indicating the transfer of a "0" bit, then the corresponding OR gate 132 through 134 fails to transmit the —8 volt pulse therethrough.

Also, when the 2 flip-flop of the modulo ring counter is activated to the set state and when any one or all of the 6, 7, 8, 9 or 10 flip-flops of the shift register is also activated to the set or reset state for indicating the transfer of a "1" or a "0" bit, respectively, the corresponding OR gate transmits a voltage pulse for indicating the transfer of a "1" bit but fails to transmit the voltage pulse for indicating the transfer of the "0" bit. In addition, when the remaining 3, 4 or 5 flip-flop of the modulo ring counter is activated to the set state and when any one or all of the remaining 11 through 22 flip-flops, some of which are not shown, of the shift register is also activated to the set or reset state for indicating the transfer of a "1" or a "0" bit, respectively, the corresponding OR gate transmits a voltage pulse for indicating the transfer of a "1" bit but fails to transmit the voltage pulse for indicating the transfer of the "0" bit.

The output of OR gate 132 is applied to the input of a No. 1 parity bit binary counter 135. The output of OR gate 133 is applied to the input of a No. 2 parity bit binary counter 136. The outputs of the two OR gates, not shown, intermediate OR gates 133 and 134 are understood to be connected to the inputs of corresponding Numbers 3 and 4 parity bit binary counters, not shown. The output of OR gate 134 is connected to the input of No. 5 parity bit counter 137. Each of these bit binary counters is of a conventional type as shown in FIGS. 22A and 22B. In the reset state, the output of the 1-side of each binary counter is a —24 volt potential while in the set state the output of its 1-side is a —8 volt potential. Assuming the flip-flop is in the reset state, the first voltage pulse representing the transfer of a "1" bit and supplied from the output of one OR gate to the input of the associated binary counter sets it while the second such input pulse resets it. This alternate setting and resetting of the respective binary counters continues until each of the five word gates associated with each OR gate is examined. By observing the 0-side and 1-side outputs of the simple parity binary counter 149 via enabling AND gates 150 and 151 in a manner that is presently explained, it is immediately apparent that an even number of input voltage pulses to this counter provides a —24 volt output potential in its 0-side output whereas an odd number of input voltage pulses provides a —8 volt potential in its 1-side output. This assumes that binary counter 149 was in the reset state in the idle condition.

It is thus evident that the No. 1 parity bit binary counter 135 monitors the number of "1" bits received in the 1, 6, 11, 16 and 21 word bit positions; the No. 2 parity bit binary counter 136 monitors the number of "1" bits received from the 2, 7, 12, 17 and 22 word bit positions; the No. 3 parity bit counter, not shown, monitors the number of "1" bits obtained from the 3, 8, 13 and 18 word bit positions; the No. 4 parity bit counter, not shown, records the number of "1" bits derived from the 4, 9, 14 and 19 word bit positions; and the No. 5 parity bit binary counter 137 keeps track of the number of "1" bits received from the 5, 10, 15 and 20 word bit positions. It is assumed that each of the five binary counters represented by the binary counters 135, 136 and 137 is in the reset state wherein its 0-side output provides a —24 volt potential. This potential obtains for an even number of "1" bit inputs but is changed to a —8 volt potential for an odd number of "1" bit inputs.

When the modulo ring counter has advanced to set the 5 flip-flop thereof, the next voltage pulse received on lead 118 sets the 0 flip-flop which thereupon resets the 5 flip-flop to recycle the modulo ring counter, as hereinbefore described in regard to FIG. 18. In the set state, the 0 flip-flop of the modulo ring counter supplies a —8 volt potential on lead 110 to reset the control modulo flip-flop 125 and to set read parity bit flip-flop 127. In the reset state, control modulo flip-flop 125 provides from its 1-side output a —24 volt potential which inhibits the 5 gates 105, 107, 107a, 107b, and 109 connected in the output of the respective stages of the modulo ring counter and leading to the word gates 102.

As the read parity bit flip-flop 127 is now in the set state, the —8 volt potential in its 1-side output primes read parity gate 138 which transmits the voltage pulses from generator 131 to lead 118 for activating the modulo ring counter through its respective 0 through 5 flip-flops in the manner described previously. At the same time the 1-side output of flip-flop 127 primes the 5 enabling AND gates 140, 141 and 142. Again, it is understood that two additional gates, not shown, are interposed between gates 141 and 142 and connected to the 3 and 4 flip-flops, respectively, not shown, in the modulo ring counter.

As the modulo ring counter is being activated for the reason just mentioned, the −8 volt potential at the 1-side output of the 1 modulo flip-flop is transmitted on lead 143 and through primed gate 140 to the input of No. 1 parity bit gate 144. At the same time, this gate is also receiving the output of the No. 1 parity bit binary counter. The −8 volt potential at the output of the 2-modulo flip-flop is transmitted on lead 145 and through primed gate 141 to the input of the No. 2 parity bit gate 146 which is also receiving the output of the No. 2 parity bit binary counter. In like manner, the 1-side outputs of the 3 and 4 flip-flops, not shown in the modulo ring counter, are transmitted through the two gates, not shown, located intermediate gates 141 and 142 and supplied to the Numbers 3 and 4 parity bit gates, not shown, located adjacent to gate 146. Finally, the −8 volt potential at the output of the 5 flip-flop in the modulo ring counter is transmitted on lead 147 and through primed gate 142 to the input of parity bit gate 148 which is also receiving the output of the No. 5 parity bit binary counter at this time. The outputs of the 5 parity bit gates represented by the gates 144, 146 and 148 are supplied to the input of a simple parity bit binary counter 149 which is a conventional type, identical with the aforenoted binary counters 135, 136 and 137.

When each of the 5 parity bit binary counters 135, 136, or 137 provides via its 0-side output a potential of −8 volts, this indicates that an odd number of "1" bits was received from the output of its associated OR gate 132, 136 or 137, respectively, whereas when these counters provide via their 0-side outputs −24 volt potentials, these indicate that an even number of "1" bits was received from the associated OR gates. Hence, when the associated parity bit gate 144, 146 or 148 is read out, each gate enabled by the −8 volt potential from its associated binary counter, but blocked by the −24 volt potentials, provides an output voltage pulse of −8 volts. Each of gates 144, 146 or 148 reads out a "1" bit for an odd number of "1" bits, for example, stored in the corresponding flip-flops of the shift register; and if desired, the circuit could be arranged to count the even number of such "1" bits. These voltage pulses representing the odd number of "1" bits stored in the shift register set and reset in turn binary counter 149. The voltage output from the 0-side of this counter is utilized to prime a simple parity no-good gate 150 whereas the voltage output from its 1-side is utilized to prime a simple parity OK gate 151 and a simple parity gate 152, depending on whether an odd or an even number of "1" bits was initially preselected for the first text word. The simple parity OK gate 152 is herein activated to indicate an odd number of such "1" bits whereas simple parity NG gate 150 is activated to indicate an even number of such "1" bits.

After the No. 5 parity bit gate 148 is read out when the 5 flip-flop of the modulo ring counter has been set, the modulo ring counter recycles into the position with its 0 flip-flop activated to the set state due to a voltage pulse on lead 118 as previously mentioned. At this time, the −8 volt potential on lead 110 serves to reset the read parity flip-flop 127 via gate 126 which is now primed by the −8 volt potential obtained from the 1-side output of this flip-flop lying in the set state. This precludes further activation of the modulo ring counter at the moment.

The −8 volt potential from the 1-side output of the set 0 flip-flop of the modulo ring counter on lead 110 is also applied to the input of inhibiting AND gate 128. As this gate is also receiving a −24 volt potential from the 1-side output of simple parity inhibiting flip-flop 153 which is in the reset state at this time, the −8 volt potential on lead 110 is passed through gate 128 to the inputs of simple parity no-good gate 150 and the simple parity OK gate 151. If the simple parity of an odd number of "1" bits as above noted were satisfactory as reflected by the 1-side output of the simple binary counter 149, the simple parity OK gate provides an output voltage transmitted on lead 32 to the data equipment 9 which is thereby informed that the simple parity of the word just transferred was satisfactory and that the next word should be transferred. The output from the simple parity OK gate 151 on lead 33 is used to read out the parity gates and text gates in FIG. 9 in a manner and for a purpose that are hereinafter explained.

If it turned out that the simple parity determination of an even number of "1" bits as above mentioned were unsatisfactory as reflected by the 0-side output of the simple parity binary counter 149 in FIG. 8, the simple parity no-good gate 150 provides an output voltage sent on lead 35 to the data equipment 9. This voltage informs the data equipment 9 that the transfer of the first text word was unsatisfactory and that such word should be transferred a second time. This transfer is repeated until the first text word is satisfactorily transferred as reflected by the output of the simple parity OK gate 151 in the manner just mentioned.

In order to prepare for the transfer of the next word from the data equipment to the shift register 30 in FIG. 8, it is necessary to reset this shift register. This is achieved by using the output voltage from either the simple parity no-good gate 150 via lead 35 or the simple parity OK gate 151 or via lead 32 to the input of OR gate 160. The output of this gate applied through a delay network 161 of suitable type resets the 1 through 27 flip-flops included in the shift register 30. This delay of predetermined amount is necessitated to ensure the reading out of the text and parity gates 164 and 166, respectively, in FIG. 9 in response to the −8 volt potential in the output of simple parity OK gate 151 as transmitted on lead 33 before the word information in the shift register is destroyed, as hereinafter explained.

It is evident that when the next word or the faulty word is transferred from the data equipment 9 to the shift register 30 in FIG. 8, the control modulo flip-flop 125 is activated to the set state by the word-sent voltage received via lead 90 and gate 91 whereupon the cycle of operation involving the stepping of the modulo ring counter just described is repeated.

*Message write-in into twistor memory.*—Twistor memory 38 in FIGS. 2, 3, 15 and 16 is of a type disclosed in the copending application of A. H. Bobeck, Serial No. 675,522 filed August 1, 1957, now United States Patent No. 3,083,353 issued March 26, 1963, and comprises a plurality of slots or areas, each adapted to store one message. Some of the slots are adapted to store outgoing messages while others are adapted to store incoming messages. As previously mentioned, each message slot is capable of storing eleven words comprising a control word and ten text words. A 27-bit control word is stored in the uppermost position of each message slot while each of the text words is stored one after the other below the control word. The control and text words are thus stored in columnar form in each message slot. The information comprising 27 bits for each word is written-in in parallel form at one time by longitudinal currents supplied to both the twistor wire which stores a bit and to the solenoid which constitutes a word slot; and it is read out in the same form by transverse currents for storage in the word size shift register. Each word is, however, read out from the twistor memory one bit at a time for transmission to the desired distant data processing station, as hereinbefore mentioned.

The message write-in procedure is illustrated in FIG. 15 in which it is seen that the twistor memory 38 comprises outgoing message slots A and B, each of which includes 11 word solenoids. Of these, one is reserved for the control word while the remaining ten are for the text words. From the previous description, it is now recalled that the operation of message slot availability detector 26 in FIG. 9 provided an output voltage which was supplied on lead 86 and sets write-in control flip-flop 87 in FIG. 12. This flip-flop in the set state provides a −8 volt potential from its 1-side output for enabling gate 162. This gate at the moment is receiving a −8 volt potential from the output of simple parity OK gate 151 on lead 33 in FIG. 8. This voltage accepted by gate 162 is applied on the 3 lead in FIGS. 12 and 15 to one input of OR gate 159 whose other input is controlled by clock pulses originating in FIG. 11 in a manner and for a purpose that are subsequently explained.

Figure 16:
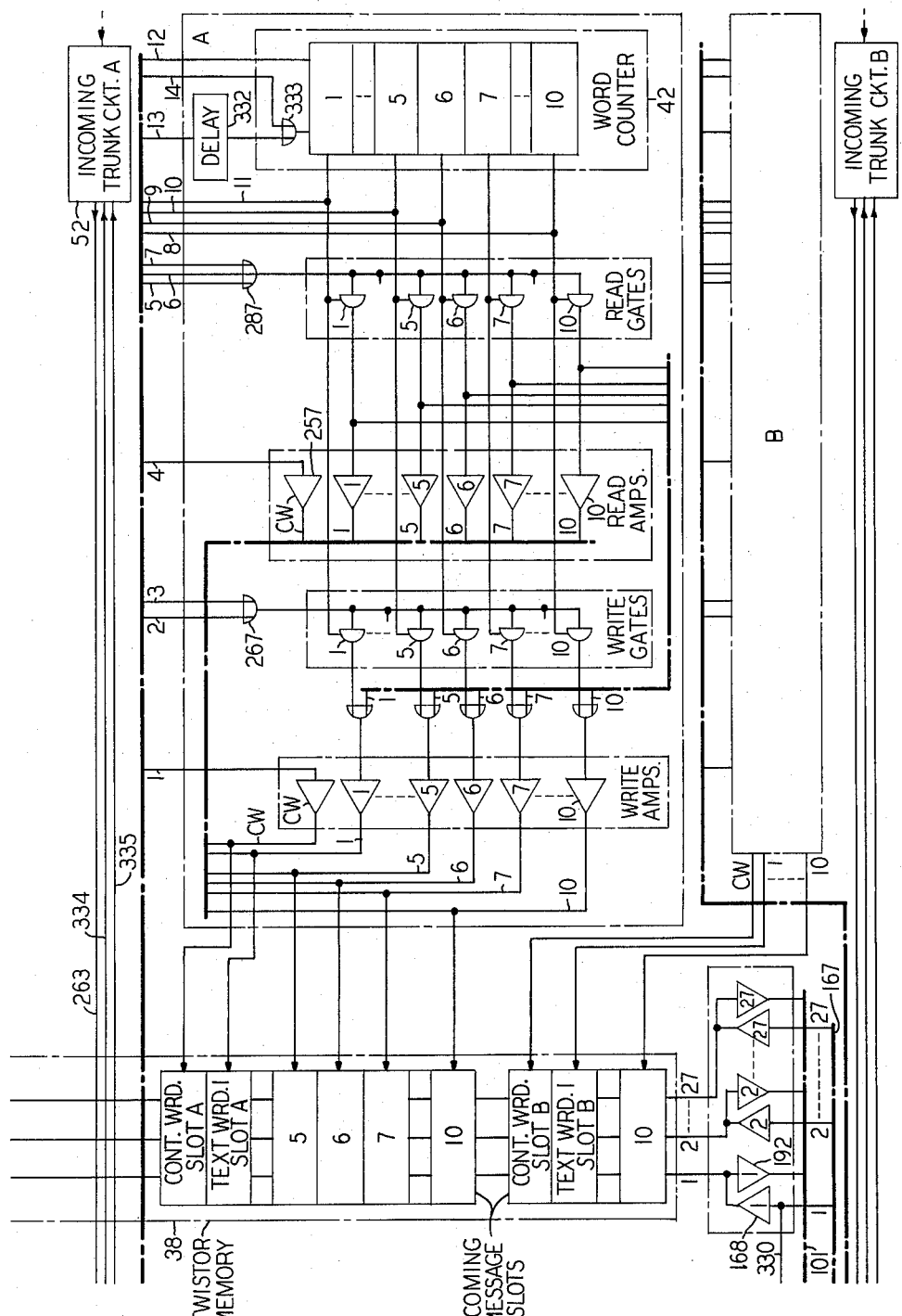

Associated with slot A in FIG. 15 are ten write gates, one for each text word of a ten-word message; eleven write amplifiers, one for the control word and one for each text word; a ten-word word counter 42, one position for each text word; and in FIG. 16 twenty-seven bit write-in amplifiers 168, one for each of the twenty-seven bit flip-flops included in the word size shift register 30 in FIG. 8. The bit write amplifiers are common to all incoming and outgoing trunks accommodated by the twistor memory. Before the first text word of the message is stored in the twistor memory, word counter 42 is advanced to the "1" position in a manner that is presently explained. The word counter ensures that the text words and parity bits are stored in their proper positions in the twistor memory. At this time, it is understood that the control word for slot A is already stored therein. The word counter shown in FIGS. 15 and 19 is reversible to compensate for the faulty reception of received words as further explained below.

Figure 12:
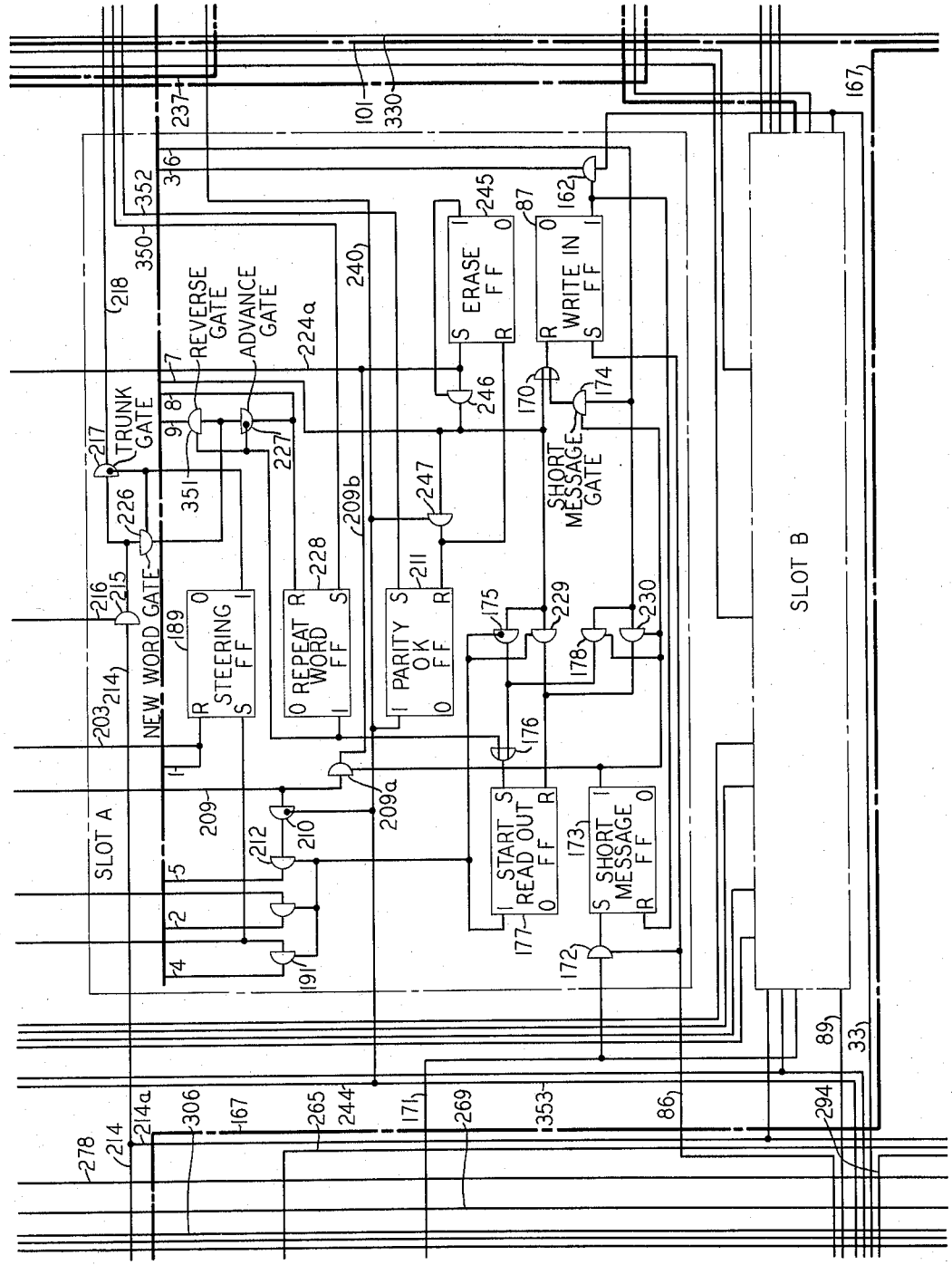

As the "1" write gate in FIG. 15 is enabled by the output of the 1 position of word counter 42 in FIG. 15, the −8 volt potential in the output of OR gate 162 in FIG. 12 is transmitted through "1" write gate to the "1" amplifier whose output is supplied to the first text word of word slot A in the twistor memory. The appropriate solenoid is thus selected to record the first text word of the message. At the same time, the −8 volt potential effective on lead 33 in the output of simple parity OK gate 151 in FIG. 8 is also supplied on lead 163 in FIG. 9 to the inputs of the respective serially connected 1 through 22 parity OR gates and associated 1 through 22 text enabling AND gates 164. The control or prime leads of the 1 through 22 text gates are also connected via the corresponding 1 through 22 leads 165 to the 1-side outputs of the 1 through 22 flip-flops included in the shift register 30 in FIG. 8. In addition, the −8 volt potential on lead 33 in the output of simple parity OK gate 151 in FIG. 8 is also supplied on lead 163 to the inputs of the respective serially connected OR gates, enabling AND gates and rectifiers 166 in FIG. 9. These 23 through 27 gates 166 are also connected to the respective outputs of the No. 1 through No. 5 binary counters in FIG. 8.

The "1" bits recorded in the 1 through 22 flip-flops in the set state in the shift register 30 in FIG. 8 provide −8 volt potentials at the respective 1-side outputs. The "0" bits recorded in the 1 through 22 flip-flops in the reset state in the shift register 30 provide −24 volt potentials at the respective 1-side outputs. When the two inputs to the respective text word AND gates 164 receive the −8 volt potential, via leads 163 and 165, the outputs of these gates transmit the −8 volt potential to the corresponding 1 through 22 leads 167 for representing a "1" bit. But, when the respective gates receive the −24 volt potential on lead 165 and the −8 volt potential on lead 163, these gates are blocked so that their outputs transmit no voltage on the corresponding 1 through 22 leads 167 for representing a "0" bit.

When the two inputs to the respective parity AND gates 166 receive the −8 volt potential from lead 163 and from the 1-side outputs of the No. 1 through No. 5 parity bit binary counters 135, 136 and 137 in FIG. 8, the outputs of the respective gates transmit the −8 volt potential to lead 167 for indicating an odd number of "1" bits. When, however, the respective parity gates 166 receive the −8 volt potential on lead 163 but a −24 volt potential from the 1-side outputs of the No. 1 through No. 5 parity bit binary counters 135, 136 and 137 in FIG. 8, these gates are blocked so that their outputs transmit no voltage on lead 167 for representing an even number of "1" bits.

The −8 volt potential outputs of the 1 through 27 text word and parity AND gates 164 and 166, respectively, are supplied on the corresponding 1 through 27 leads 167 in FIGS. 9, 12 and 16 to the inputs of the associated 1 through 27 bit write-in amplifiers 168 whose outputs are connected to the corresponding 1 through 27 twistor wires included in the first word of the outgoing message slot of the twistor memory in FIG. 16. As the 1 word write amplifier in FIG. 16 and the 27 bit write-in amplifiers in FIG. 16 are now simultaneously activated, all text-word"1" bits stored in the 1 through 22 flip-flops of the shift register 30 and all "1" parity bits stored in the Nos. 1 through 5 binary counter in FIG. 8 constituting the first text word of the message are recorded in the outgoing slot A of the twistor memory 38 in FIG. 15.

The −8 volt potential from the output of gate 162 in FIG. 12 is also applied via the 3 lead in FIGS. 12 and 15 and a delay network 158 in FIG. 15 to OR gate 169 included in word counter 42 in FIGS. 15 and 19. This voltage accepted by the OR gate advances word counter 42 to position 2 for recording the second text word in outgoing slot A of the twistor memory. The above-described procedure for recording the first word is repeated for recording each of the remaining nine text words of the message in the twistor memory. When the word counter has recycled to the 1 position for indicating the tenth and final text word of the message has been recorded in outgoing slot A of the twistor memory, the −8 volt potential on the 7 lead in FIG. 15 is applied on the corresponding 7 lead in FIG. 12 to one input of OR gate 170. This gate transmits the −8 volt potential which resets write-in flip-flop 87, in preparation for the recording of the respective ten words of the next ten-word message in outgoing message slot B of the twistor memory.

When the message involved for recording in outgoing message slot A of the twistor memory in FIG. 15 is a short message having, for example, five words, the data equipment 9 in FIG. 9 transmits a −8 volt potential on lead 171 to the input of enabling AND gate 172 in FIG. 12. This gate, at this time, is enabled by a −8 volt potential effective on lead 86 in FIG. 12 whereupon the −8 volt potential is accepted and transmitted by gate 172 to set short message flip-flop 173. The −8 volt potential from the 1-side output of set flip-flop 173 enables short message enabling AND gate 174 which receives its input via the 6 lead in FIGS. 12 and 15. When, in FIG. 15, the word counter has advanced to the 6 position, a −8 volt potential is applied to the 6 lead from the 1-side output thereof. The gate 174 in FIG. 12 is thus activated to transmit a −8 volt potential via OR gate 170 to reset the associated write-in control flip-flop 87 thereby indicating the completion of the recording of the assumed 5-word short message.

*Text bit read out procedure.*—At this time, the five or ten-word message recorded in outgoing message slot A of the twistor memory in FIG. 15 at data station 10 is ready for transmission to data station 11 in FIG. 1. Referring to FIG. 15, it is seen that 1 through 10 read amplifiers and 1 through 10 read enabling AND gates are associated with outgoing message slot A. When the word counter 42 in FIG. 15 has recycled to the 1 position for indicating that the last text word of a previous ten or a five-word message has been recorded in the twistor memory, a −8 volt potential is applied to the 7 lead from the 1-side output of the 0 flip-flop of the word counter for the ten-word message while a −8 volt potential is supplied to the 6 lead from the 1-side output of the 6 flip-flop of the word counter.

The −8 volt potential on the 7 lead for the ten-word message is supplied to the input of inhibiting gate 175 in FIG. 12 which is also receiving at this time a —24 volt control potential from the 1-side output of start read out flip-flop 177 in one reset state. Now, the —8 volt potential in the output of enabled gate 175 applied via OR gate 176 sets start read out flip-flop 177. This in the set state provides a —8 volt potential at the 1-side output for a purpose that is presently mentioned. For a five-word message, it is evident in FIG. 12 that the —8 volt potential on the 6 lead is applied to the input of enabling AND gate 178 which is enabled at this time by the —8 volt potential from the 1-side output of short message flip-flop 173 in the set state as previously mentioned. This —8 volt potential accepted by gate 178 is applied through OR gate 176 to set flip-flop 177. As the following operation is the same for both five and ten-word messages, the operation hereinafter described is concerned with the ten-word message, in accordance with the previous assumption.

Figure 11:
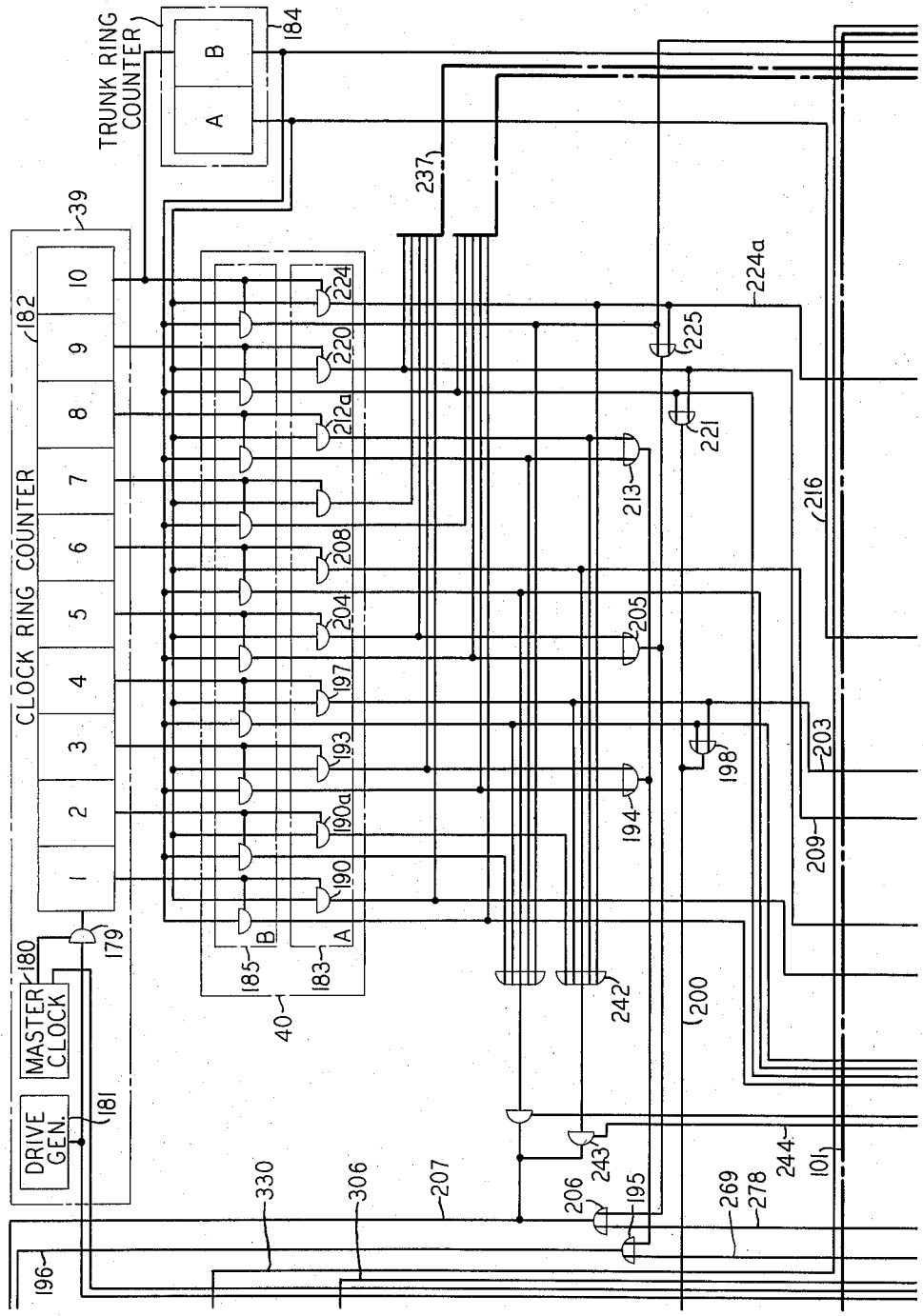

The setting of flip-flop 177 initiates an operating sequence whereby discrete voltage pulses separated by predetermined time intervals can be accepted from a clock circuit 39 shown in FIGS. 2 and 11. This circuit comprises a master clock 180, a pulse generator 181 and an enabling AND gate 179 for driving a 10-stage ring counter 182 at a 1.5 microsecond rate. This counter is a recycling type which is essentially hereinbefore described regarding the modulo ring counter 103 in FIGS. 8 and 18. The respective output voltages of the several stages of clock ring counter 108 advanced by successive generator and clock pulses controlled by gate 179 activate control logic circuit 40 shown in FIGS. 2 and 11 and comprising a group 183 of ten enabling AND gates enabled by the voltage output of stage A of a trunk ring counter 184 for steering outgoing messages into outgoing message slot A of twistor memory 38 in FIG. 15 and a group of ten enabling AND gates 185 enabled by the voltage output of stage B of trunk ring counter 184 for steering outgoing messages into outgoing message slot B of the twistor memory in FIG. 15, in a manner that is presently explained.

While the trunk ring counter shows two stages A and B for the purpose of this explanation, it is evident that it may comprise a number of stages corresponding with the number of outgoing message slots in the twistor memory, one trunk counter stage being alloted to each such outgoing message slot and outgoing trunk associated therewith. The trunk ring counter is a conventional type which is essentially similar, for example, to the modulo ring counter 103 shown in FIGS. 8 and 18. Since outgoing message in slot A of twistor memory 38 in FIG. 15 is assumed to be involved in the data transmission being presently described, it is also assumed that stage A of the trunk ring counter is operative. The master clock 180 controls the processing of the outgoing messages in slots A and B of the twistor memory, and allows sufficient time for message transfer from the data equipment 9 to the associated transmitting and receiving data processing apparatus connected thereto as herein described.

The voltage pulse of —8 volts from the output of the 1 position of clock ring counter 182 in FIG. 11 is transmitted through start enabling AND gate 190 enabled by a —8 volt potential supplied from trunk ring counter stage A. This —8 volt potential accepted by gate 190 sets steering flip-flop 189 in FIG. 12 for a purpose that is later mentioned, and to the input of enabling AND gate 191 in FIG. 12 enabled by a —8 volt potential from the 1-side output of start read out flip-flop 177 in the set state as just mentioned. The —8 volt potential accepted by gate 191 is supplied via the 4-lead in FIGS. 12 and 15 to the input of read control word amplifier CW in FIG. 15.

It is now recalled from the previous explanation and Table A that the control word comprises 27 bits recorded in outgoing slot A of the twistor memory 38 in FIG. 15 in the following manner: 100 . . . 0, indicating the transmission of the 27th bit of the last text word. Now, the amplified output of the read control word amplifier CW activates the twistor wires of the control word solenoid of outgoing message slot A of twistor memory 38 in FIG. 15. As a consequence of such activation, the 27 bits of the complete control word are simultaneously read out in parallel from the twistor memory via the 1 through 27 amplifiers 192 in FIG. 16 and the 1 through 27 leads 101 to the inputs of the corresponding 1 through 27 OR gates 100 in FIG. 8.

For the purpose of the read out of the control word, it is understood that a positive potential going from —24 volts to —8 volts is supplied by the 1 bit in the No. 1 bit position of the control word in the twistor memory to the input of the No. 1 amplifier of the 1 through 27 sensing amplifiers 192 whereas —24 volt potentials are supplied by the 0 bits in the Nos. 2 through 27 positions of the control word in the twistor memory to the inputs of the Nos. 2 through 27 of the sensing amplifiers in FIG. 16. These potentials, as amplified in the outputs of the 1 through 27 sensing amplifiers 192, are applied via the 1 through 27 leads 101 in FIGS. 11, 12, and 13 to the inputs of the 1 through 27 OR gates 100 in FIG. 8. The positive going potential representing the 1 bit in the No. 1 position of the control word in the twistor memory and transmitted through the 1 OR gate sets the 1 flip-flop of the shift register whereas the —24 volt potentials representing the 0 bits in the Nos. 2 through 27 positions of the control word in the twistor memory are blocked by the 2 through 27 OR gates whereby the 2 through 27 flip-flops of the shift register are permitted to remain in the reset state. The control word is thus transferred from the twistor memory and stored in the shift register.

Referring back to the clock circuit of FIG. 11, the 2 position output voltage of the clock ring counter is used for a purpose that is later mentioned. The pulse from the 3 position of the clock ring counter is accepted by enabling AND gate 193 enabled by the —8 volt potential from the output of trunk ring counter stage A. This —8 volt potential is applied via OR gates 194 and 195 and lead 196 in FIG. 8 to the shift register for advancing it one stage. This removes the 0 bit from the No. 27 position and rewrites it in the No. 1 position while the 1 bit is advanced to the No. 2 position. The control word appears now in the shift register in the form of 0100 . . . 0 in preparation for the transmission of the first bit of the first word of the message as indicated in aforenoted Table A. The 2 flip-flop of the shift register is now activated to the set state to represent new position of the 1 bit in the control word in the shift register.

The —8 volt output from the 4 position of the clock ring counter in FIG. 11 is accepted by enabling AND gate 197 enabled by the —8 volt potential from the output of trunk ring counter stage A. The —8 volt potential from the output of gate 197 is applied via OR gate 198, lead 200 in FIG. 8 and OR gate 201 in FIG. 9 to the inputs of the 1 through 27 write back gates 202. Of these gates, the No. 2 write back gate is enabled by the —8 volt potential supplied from the 1-side output of the set 2 flip-flop to the 2 lead of the 1 through 27 leads 165 extending from the 1-side outputs of the 1 through 27 flip-flops included in the shift register in FIG. 8, whereas the remaining 1 and 3 through 27 leads 165 transmit —24 volt potentials because of their associated reset 1 and 3 through 27 flip-flops in the shift register thereby blocking the corresponding 1 and 3 through 27 write back gates. The output of the No. 2 write back gate reflecting the identity of the control word as now stored in the shift register is supplied on the No. 2 lead of the 1 through 27 leads 167 to the input of the No. 2 amplifier of the 1 through 27 bit writing amplifiers 168 in FIG. 16. As the 1 and 3 through 27 write back gates are blocked, their outputs supply no potentials to the inputs of the corresponding 1 and 3 through 27 bit writing amplifiers for representing the 0 bits in the 1 and 3 through 27 positions of the control word.

Referring back to gate 197 in FIG. 11, it is seen that the —8 volt output thereof is also supplied on lead 203 in FIGS. 11 and 12 to reset steering flip-flop 189, and on the 1 lead in FIGS. 12 and 15 to the input of the control word write amplifier CW. The output of this amplifier activates the solenoid for the control word in the outgoing message slot A of the twistor memory. As the No. 2 amplifier only of the 1 through 27 bit-write amplifiers 192 is activated at this time, its output energizes the corresponding No. 2 twistor wire of the 1 through 27 twistor wires associated with outgoing message slot A of the twistor memory. As the 1 and 3 through 27 amplifiers 192 are not energized, their outputs stimulate no action on the corresponding 1 and 3 through 27 twistor wires of the twistor memory. This serves to write back the "1" bit of the control word into the No. 2 position of the control word solenoid as indicated in above-noted Table A. The control word is thus written back into the twistor memory in FIG. 15. This completes the preparation for the transmission of the first bit of the first text word from the twistor memory outgoing slot A to the desired distant data station 11, in a manner that is presently explained.

The —8 volt potential obtained from the 5 position of the clock ring counter in FIG. 11 is accepted by enabling AND gate 204 enabled by the —8 volt potential received from the output of trunk ring counter stage A. The —8 volt potential effective in the output of gate 204 and applied in a circuit including OR gates 205 and 206, lead 207 in FIG. 11, and lead 207 and OR gate 160 and delay network 161 in FIG. 8. resets simultaneously the 1 through 27 flip-flops of the shift register. Actually, this voltage resets the No. 2 flip-flop which is in the set state but fails to affect the remaining 1 and 3 through 27 flip-flops since they are already in the reset state at this time. The control word is thus erased from the shift register.

The —8 volt output provided by the 6 position of the clock ring counter in FIG. 11 is accepted by enabling AND gate 208 enabled by the —8 volt potential obtained from the output trunk counter stage A. The —8 volt potential from the output of gate 208 is applied on lead 209 in FIGS 11 and 12 to the input of inhibiting AND gate 210 which is concurrently enabled by a —24 volt potential supplied from the 1-side output of parity OK flip-flop 211 in the reset state at this time. Gate 210 transmits the —8 volt potential to enabling AND gate 212 enabled by the —8 volt potential received from the 1-side output of start read-out flip-flop 177 in the set state. The —8 volt potential in the output of gate 212 is applied on the 5 leads in FIGS. 12 and 15 to the input of the 1 read gate in FIG. 15. As this gate is enabled by the —8 volt potential received from the 1 position of word counter 42 in FIG. 15, it transmits a —8 volt potential to the associated 1 read amplifier. As the first word of the message is to be transmitted at this time, the word counter is assumed to be in the 1 position.

The output of the 1 read amplifier activates the twistor wires of the first text word solenoid of outgoing message slot A of the twistor memory. As a consequence of this activation, the 27 bits of the first text word are simultaneously read out in parallel from the twistor memory via the 1 through 27 amplifiers 192 in FIG. 16, and the 1 through 27 leads 101 to the inputs of the corresponding 1 through 27 OR gates 100 in FIG. 8. Recalling now that the 1 through 27 flip-flops of the shift register 30 in FIG. 8 are in the reset state, it is understood that the first text word bits provide positive voltages going from —24 volt potential to —8 volt potentials for representing 1 bits and fixed —24 volt potentials for representing 0 bits. The positive going potentials applied from the outputs of the corresponding OR gates set the associated flip-flops of the shift register whereas the —24 volt potentials applied from the outputs of the corresponding OR gates to the set inputs of the associated flip-flops of the shift register fail to activate them from the reset state. The respective flip-flops of the shift register are set to indicate 1 bits and reset to indicate 0 bits of the first text word whereby the first text word is stored in the shift register.

The —8 volt output derived from the 7 position of the clock ring counter in FIG. 11 is used for a purpose that is later mentioned. The —8 volt potential received from the 8 position of the clock ring counter in FIG. 11 is accepted by enabling AND gate 212a enabled by the —8 volt potential obtained from the trunk ring counter stage A. This —8 volt potential effective in the output of gate 212a is applied in a circuit including OR gates 213, 194 and 195 in FIG. 11 and lead 196 in FIGS. 11 and 8 to the input of the shift register which is thereby activated to advance one stage. If a 1 bit were stored in the No. 27 flip-flop of the shift register, a —8 volt potential representing such 1 bit and provided by the 1-side output of this flip-flop is transmitted on lead 214 in FIGS. 8, 9 and 12 to the input of associated enabling AND gate 215, and at the same time such 1 bit is written back into the 1 position in the shift register. Gate 215 is presently enabled by the —8 volt potential received from trunk ring counter stage A on lead 216 in FIGS. 11 and 12.

Gate 215 transmits its —8 volt output to the input of inhibited AND gate 217 enabled by the —24 volt potential received from the 1-side output of steering flip-flop 189 shown in FIG. 12 and activated to the reset state by the output voltage of the 4 position of the ring counter in FIG. 11 as previously noted. As new word enabling AND gate 226 is receiving the —24 volt potential from the 1-side output of reset steering flip-flop 189, this gate is blocked to the transmission of the voltage representing the last-mentioned 1 bit of the first text word. The —8 volt potential in the output of enabled gate 217 is transmitted on lead 218 in FIGS. 12 and 15 to outgoing trunk circuit 46 associated with outgoing message slot A of the twistor memory in FIG. 15. This trunk delivers the 27th bit of the first text word to the desired distant data station 11, as hereinbefore assumed. If a 0 bit were stored in the No. 27 flip-flop of the shift register, a —24 volt potential representing such 0 bit and provided by the 1-side output of the flip-flop is transmitted on lead 214 in FIGS. 8, 9 and 12 to the input of gate 215, and at the same time the 0 bit is written back into the 1 position of the shift register. This gate blocks the transmission of the —24 volt potential on lead 218 to the outgoing trunk circuit 46, thereby indicating the transmission of a 0 bit. The first 1 or 0 bit of the first text word is thus transmitted to the distant data station.

The 16 volt positive going potential obtained from the 9 position of the clock ring circuit in FIG. 11 is accepted by enabling AND gate 220 enabled by the —8 volt potential received from the trunk ring counter stage A. This potential effective via OR gate 221 and lead 200 in FIGS. 11 and 9 and OR gate 201 in FIG. 9 is supplied to the inputs of the associated 1 through 27 write back gates 202. Of these gates, the ones receiving the —8 volt potentials from the 1-side outputs of the corresponding set flip-flops in the shift register in FIG. 8 are enabled while the ones receiving the —24 volt potentials from the 1-side outputs of corresponding reset flip-flops in the shift register 30 in FIG. 8 are not enabled.

The outputs of the 1 through 27 write back gates 202 reflecting the identity of the first text word as now stored in the shift register are simultaneously supplied in parallel on the 1 through 27 leads 167 to the inputs of the 1 through 27 bit writing amplifiers 168 in FIG. 16. The outputs of these amplifiers activate the corresponding 1 through 27 twistor wires of the first text word solenoid, since the 1 position of the word counter 42 in FIG. 15 is operative at this time. The first text word is thus read back into the first text word solenoid of outgoing message slot A of the twistor memory in FIG. 15.

The —8 volt potential supplied by the 10 position of the clock ring counter in FIG. 11 is accepted by enabling AND gate 224 enabled by the —8 volt potential obtained from the trunk ring counter stage A. This potential effective in the output of gate 224 and supplied via OR gates 225 and 206 and lead 207 in FIG. 11, and OR gate 160 and delay network 161 in FIG. 8 resets the 1 through 27 flip-flops constituting the shift register. This resets all flip-flops that were set to represent the 1 bits of the first text word but does not affect the flip-flops that were reset to represent the 0 bits of the first text word. The first text word is thus erased from the shift register.

The foregoing procedure is then repeated for the transmission of the first bit of the first text word of the message in outgoing slot B of the twistor memory 38 in FIG. 15, as well as for the first bit of the first text word of each message recorded in additional outgoing slots of the twistor memory. In these instances, it is understood that the voltage outputs from clock ring counter 182 in FIG. 11 are steered to the appropriate outgoing twistor slots and trunk circuits via steering flip-flops similar to steering flip-flop 189 in FIG. 12. In the above manner, the successive bits of the first text words of the respective messages in the several outgoing slots of the twistor memory are transmitted.

When the 1 bit of the control word attains the No. 27 position therein, the completion of the transmission of the first text word of the message in outgoing slot A is imminent. At this point, the control word now comprises the 27 bits arranged as follows: 000 . . . 1, as shown in Table A. This indicates that the transmission of the 26th bit of the first text word to the data station 11 in FIG. 1 is completed. Again, the voltage output of the 1 position of the clock counter in FIG. 11 reads out the control word from the twistor memory and writes it into the shift register. This is then advanced one stage by the voltage output from the 3 position of the clock ring counter in FIG. 11 as above mentioned. At this time, the —8 volt potential representing the 1 bit in the No. 27 position of the control word is transmitted therefrom onto lead 214 in FIGS. 8, 9 and 12 to the input of gate 215 which is enabled by the —8 volt potential effective on lead 216 from the output of trunk ring counter stage A. Also, at the same time the 1 bit is inserted into the No. 1 position in the control word which now comprises the 27 bits arranged as follows: 100 . . . 0, as shown in Table A.

The —8 volt output of gate 215 is applied to new word enabling AND gate 226 and to trunk gate 217. As steering flip-flop 189 is now activated to the set state by the voltage output of the 1 position of the clock ring counter 182 in FIG. 11, the —8 volt potential effective in its 1-side output enables new word gate 226 but blocks trunk gate 217, the latter precluding the transmission of the control word 1 bit on line 218 to the outgoing trunk circuit 46 in FIGS. 12 and 15. The —8 volt potential on lead 214 is therefore accepted by new word gate 226 which transmits this potential to inhibited AND gate 227. As this gate is enabled by the —24-volt potential received from the 1-side output of repeat word flip-flop 228 in the reset state, gate 227 accepts the —8 volt potential which is then transmitted on the 8 leads in FIGS. 12 and 15 to OR gate 169 included in word counter 42 in FIGS. 15 and 19. The —8 volt potential in the output of OR gate 169 activates the word counter to its 2 position for transmitting the bits of the second text word recorded in the outgoing message slots A and B, as well as any additional slots, of the twistor memory 38 in FIG. 15, in the manner herein described for transmitting the bits of the first text word.

Again, the 4 position of the clock ring counter in FIG. 11 writes the control word back into the twistor memory from the shift register. As just mentioned, it is recalled that the control word comprises the 27 bits arranged as follows: 100 . . . 0. This indicates the transmission of the 27th bit of the first text word, as illustrated in Table A. The 5 position of the clock ring counter resets the shift register to erase the control word therefrom. At the 6 position of the clock ring counter, the first text word is read into the shift register. On the 8 position of the clock ring counter the shift register is advanced one stage whereby the 27th and final bit of the first text word is transmitted from the No. 27 bit position of the shift register and transmitted to the distant data station 11 in FIG. 1, and at the same time is inserted into the No. 1 position of the first text word in the shift register. The 9 position of the clock ring counter writes the first text word back into the twistor memory from the shift register. The 10 position resets the shift register to erase the first text word therefrom. The first text word is thus retained in the twistor memory exactly in the form it was initially written thereinto.

The first text words are retained in the respective outgoing message slots of the twistor memory until a retransmission of such words is requested from the receiving apparatus in data station 11, and if such retransmission is not so requested, the first text words are erased from the twistor memory, in a manner that is subsequently explained. The control words are never erased, but retained always in their respective outgoing message slots of the twistor memory.

The second through tenth words of each of said messages in slots A and B, as well as those in any additional slots not shown, are transmitted in a similar manner.

When the word counter is recycled to its 1 position as above mentioned with reference to the particular circuit shown in FIG. 19 indicating the last word of each ten text word message, specifically the one in outgoing slot A of the twistor memory in FIG. 15, has been transmitted to data station 11, the —8 volt potential from such 1 position is applied on the 7 leads in FIGS. 15 and 12 to the input enabling gate 229 in FIG. 12. This gate is enabled by the —8 volt potential obtained from the 1-side output of start read out flip-flop 177 which is in the set state at the moment. Gate 229 accepts the —8 volt potential input which is applied from its output to reset start read out flip-flop 177 for precluding the transmission of additional bits from the twistor memory 42 in FIG. 15 to the distant data station 11 in FIG. 1.

If a short or five-word message were being transmitted, instead of a ten-word text message as previously assumed, the —8 volt potential from the 6 position of the word counter 42 in FIG. 15 is applied on the 6 leads in FIGS. 15 and 12 to the input of enabling AND gate 230 in FIG. 12. As this gate is now enabled by the —8 volt potential received from the 1-side output of short message flip-flop 173 in the set state, the —8 volt output from gate 230 resets start read out flip-flop 177. This completes one message transmission from the sending apparatus 13 in data station 10 to the receiving apparatus 14 in data station 11 in FIG. 1. As previously mentioned, the above-described procedure is continuously repeated for transmitting all words of all messages recorded in the several outgoing slots including slot B of twistor memory 38 in FIGS. 2 and 15 so that new messages may be continuously added to replace such transmitted messages.

*Write-in of incoming messages word parity checking.*—It is noted that while such write-in has been heretofore explained regarding FIG. 3, it is presently described with reference to the specific circuits which are now identified and which constitute the box diagram of FIG. 3. Recalling from the previous explanation that the bits of each word of each message are transmitted one at a time, and the words are transmitted in succession, it is apparent that the bits and words of each message are accepted in accordance with the same procedure in the receiving equipment at the desired data station. This, for the purpose of the instant description, was assumed to be data station 11 in FIG. 1 as above indicated. Since, as previously pointed out, certain equipments at each station are utilized in both the transmitting and receiving procedures, the receiving equipments shown in FIG. 3 and further identified hereinafter are described in connection with data station 10 in FIG. 1. It is apparent, of course, that the description would apply equally as well to the receiving equipments of stations 11 and 12 of FIG. 1.

Figure 14:
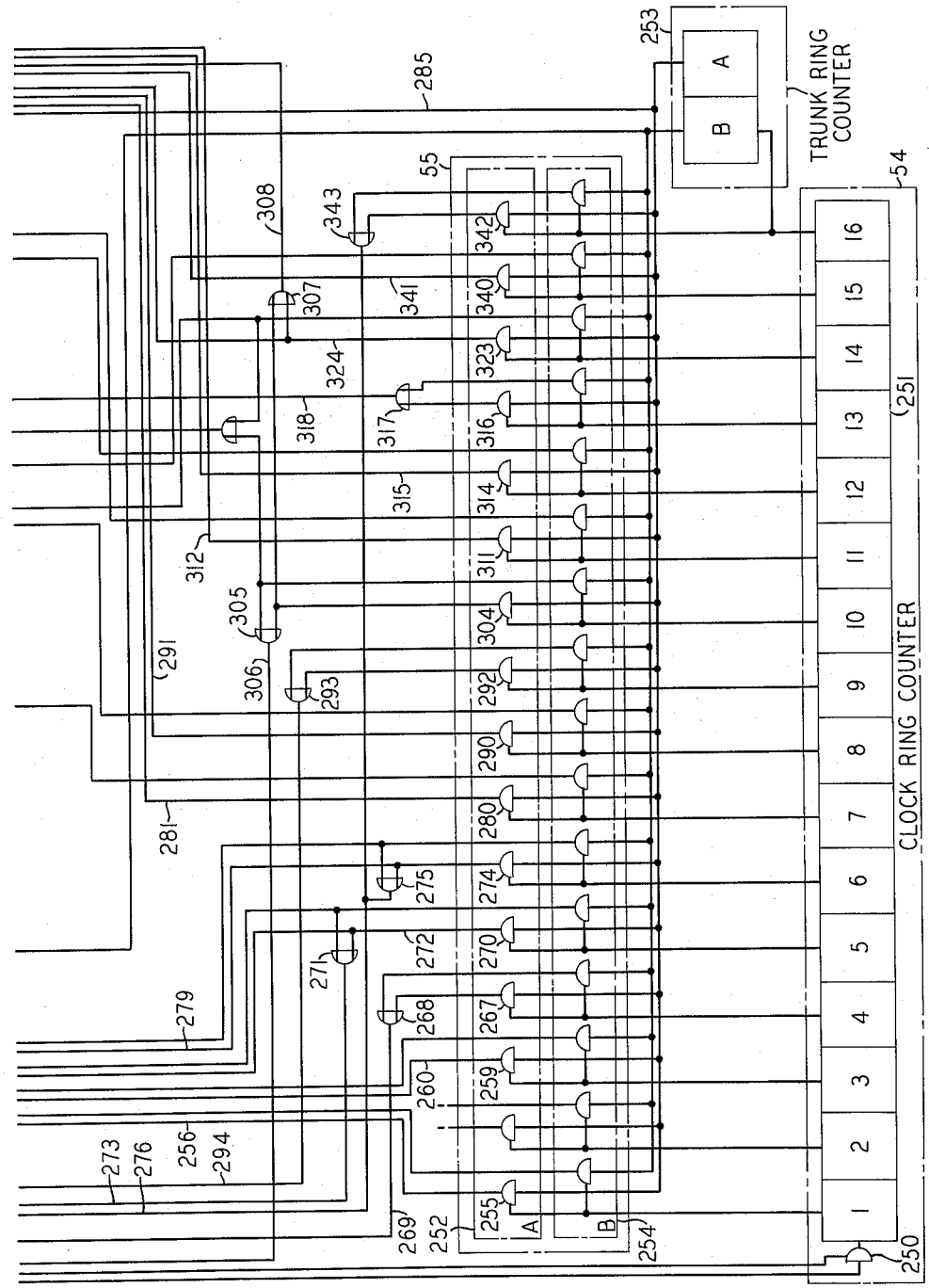

For the purpose of controlling the reception of incoming messages, the clock circuit 54 in FIG. 14 comprises master clock 180 and pulse generator 181 in FIG. 11 together with enabling AND gate 250 in FIG. 14 for driving an associated 16-stage clock ring counter 251 at a microsecond rate. This counter is a recycling type and is essentially identical with the 10-stage counter 182 in FIG. 11. The respective outputs of the several stages of clock ring counter 251 advanced by successive generator and clock pulses controlled by gate 250 activate control logic circuit 55 shown in FIGS. 3 and 14. This circuit comprises (1) a group 252 of enabling AND gates enabled by stage A trunk ring counter 253 in FIG. 14 for steering messages via incoming trunk circuit 52 in FIG. 16 into incoming slot A of twistor memory 38 in FIG. 16 and (2) a group 254 of enabling AND gates in FIG. 14 enabled by stage B of the trunk ring counter 253 for steering messages via the incoming circuit 52 into incoming slot B of the twistor memory 38, in a manner that is presently explained.

While the trunk ring counter 253 in FIG. 14 shows two stages A and B for the purpose of this explanation, it is apparent that it may comprise a number of stages corresponding with the number of incoming slots in the twistor memory, one trunk counter stage being allotted to each such incoming message slot and incoming trunk associated therewith. The trunk ring counter 253 in FIG. 14 is identical with the trunk ring counter 184 in FIG. 11. As incoming message slot A of twistor memory 38 in FIG. 16 is assumed to be involved in the data transmission being presently described, it is assumed that stage A of trunk ring counter 253 in FIG. 14 is operative. The master clock 180 controls the processing of the incoming messages in slots A and B of twistor memory 38 in FIG. 16 in a manner that is presently described.

The voltage pulse of —8 volts received from the output of operated stage A of trunk ring counter 253 in FIG. 14 is transmitted through enabling AND gate 255 enabled by the —8 volt potential received from the 1-position of clock ring counter 251. This —8 volt potential from the output of gate 255 is applied on lead 256 in FIGS. 13 and 14 and via 4 lead in FIGS. 13 and 16 to the input of associated read control word amplifier 257 whose amplified output energizes the control word solenoid of incoming message slot A of twistor memory 38 in FIG. 16. It is now recalled from the previous explanation and Table A that the control word comprises 27 bits recorded in incoming slot A in FIG. 16 in the following manner: 100 . . . 0, indicating the recording of the 27th bit of the last text word. Now the amplified output voltage of the control word amplifier 257 in FIG. 16 energizes the twistor wires of the control word solenoid of incoming message slot A of twistor memory 38 in FIG. 16.

As a consequence of such energization, the 27 bits of the control word are simultaneously read out in parallel from the twistor memory via the 1 through 27 amplifiers 192 in FIG. 16 and the 1 through 27 leads 101 in FIGS. 11, 12, 13 and 16 to the inputs of the corresponding 1 through 27 OR gates 100 in FIG. 8. For the purpose of this control word read out, it is understood that the output of the 1 amplifier of the 1 through 27 amplifiers 192 in FIG. 16 supplies a positive potential going from —24 volts to —8 volts on the corresponding 1 lead of the 1 through 27 leads 101 to the 1 OR gate of the 1 through 27 OR gates 100 in FIG. 8. As the 1 OR gate transmits this positive going potential from its output, this potential sets the 1 flip-flop of the 1 through 27 flip-flops constituting shift register 30 in FIG. 8.

At the same time the outputs of the remaining 2 through 27 amplifiers 192 in FIG. 16 supply negative potentials going from —8 volts to —24 volts on the corresponding 2 through 27 leads 101 to the inputs of the remaining 2 through 27 OR gates 100 in FIG. 8 whereby these gates are blocked. As a consequence, the 2 through 27 flip-flops of the shift register are not activated at this time but are allowed to remain in the reset states. It is now recalled from the previous explanation that the 27 bits of the control word are now stored in the shift register in the form: 100 . . . 0, as above mentioned. Also, at this time, the —8 volt potential received from the output of gate 255 in FIG. 14 and effective on lead 256 activates write control amplifier 258 in FIG. 13.

The voltage output of the 2 position of clock ring counter 251 in FIG. 14 is not used, although it does serve to provide the necessary time delay between the read out and write-in operations of incoming slot A of the twistor memory 38 in FIG. 16. The voltage outputs of the 3 position of clock ring counter 251 and of stage A of trunk ring counter 253 in FIG. 14 are simultaneously applied to gate 259 whose output provides the —8 volt potential on lead 260 to the input of write-in start enabling AND gate 261 in FIG. 13. This gate is enabled at the moment via the —8 volt potential received from the 1-side output of incoming bit flip-flop 262 in the set state. This flip-flop is assumed to be set in response to a 1 bit received on lead 263 from the output of incoming trunk circuit A in FIG. 16. The —8 volt potential provided by the output of enabled gate 261 is applied to the input of OR gate 264 in FIG. 13, the other input of this gate receiving no voltage from incoming slot B. The —8 volt potential in the output of gate 264 is applied on lead 265 in FIGS. 9, 12 and 13 to the inputs of 1 through 27 enabling incoming bit AND gates 266 in FIG. 9.

As 1 flip-flop of shift register 30 is in the set state in FIG. 8, its 1-side output provides a —8 volt potential on the 1-lead of the 1 through 27 leads 165 in FIGS. 8 and 9; and since the remaining 2 through 27 flip-flops are in the reset state, their 1-side outputs provide —24 volt potentials on the remaining 2 through 27 leads 165 in FIGS. 8 and 9. As a consequence only the 1 gate of the 1 through 27 incoming bit gates 266 is enabled whereas the remaining 2 through 27 incoming bit gates 266 are blocked. The enabled 1 incoming bit gate 266 accepts its input of —8 volts and transmits it on lead 167 in FIGS. 9, 12 and 13 to the input of its corresponding 1 amplifier of the 1 through 27 bits write amplifiers 168 in FIG. 16, while the blocked incoming bit gates 2 through 27 provide no voltages via their corresponding 2 through 27 leads 167 to the inputs of their associated 2 through 27 bit write amplifiers 168 in FIG. 16. As the 1 bit write amplifier 168 in FIG. 16 only is energized at this time and since word counter 42 is assumed to be in the 1 position, the 1 amplifier output activates only the 1-position twistor wire of 1 through 27 twistor wires of twistor memory 38 in FIG. 16.

Figure 13:
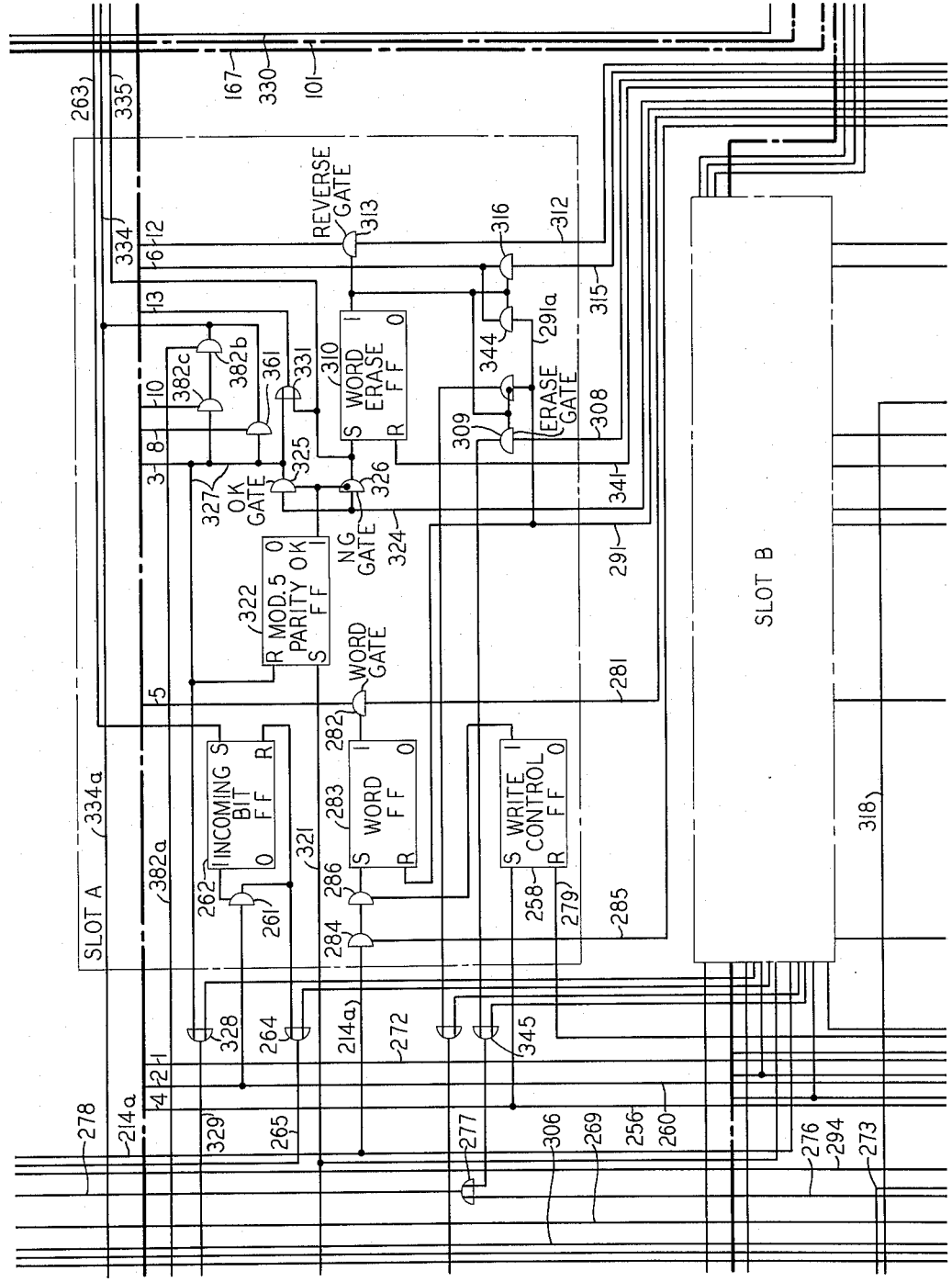

The —8 volt potential effective on lead 260 via gate 259 from the 3 position of the clock ring counter 251 in FIG. 14 is also applied on the 2 lead in FIGS. 13 and 16 to the input of OR gate 267 in FIG. 16. This gate transmits the —8 volt potential to the input of the 1 write enabling AND gate which is also receiving a —8 volt potential from the output of the 1 position of word counter 42. Since the first text word of the incoming message to slot A is being received at this time, the word counter is assumed to be adjusted to its 1 position. This 1 write gate is then caused by its two inputs just mentioned to transmit a —8 volt potential to the input of the associated 1 write amplifier. The amplified output of this amplifier activates the solenoid of the first text word in slot A. As the 1 bit write amplifier 168 in FIG. 16 and the 1 write amplifier in FIG. 16 are now simultaneously energized, the outputs therefrom serve to write the first 1 bit of the first text word of the incoming message in the No. 1 position of the first text word in the twistor memory.

The voltage output of the 4 position of the clock ring counter and stage A of the trunk ring counter in FIG. 14 activate enabling AND gate 267 to transmit a −8 volt potential to one input of OR gate 268. This gate transmits the −8 volt potential via lead 269 in FIGS. 11, 12, 13 and 14 to associated OR gate 195 whose output of a −8 volt potential is transmitted on lead 196 to shift register 30 in FIG. 8. This potential advances the shift register one stage whereupon the 0 bit in the 27th position of the control word is transmitted therefrom and written immediately back into the 1st position thereof while the 1 bit is advanced to the 2nd position thereof. At this moment, the 27 bits of the control word occupy in the shift register the form: 0100 . . . 0. This means that the 2 flip-flop only of the shift register is set while the 1 and 3 through 27 flip-flops are reset.

The voltage output of the 5 positions of the clock ring counter 251 in FIG. 14 primes enabling AND gate 270 which is also receiving the voltage output from the associated stage of trunk ring counter 253 in FIG. 14. Gate 270 is thus enabled to transmit a −8 volt potential from the output thereof to the input of OR gate 271 and onto associated lead 272. From the output of OR gate 271, the −8 volt potential is applied on lead 273 in FIGS. 9, 10, 13 and 14 to the input of OR gate 201 in FIG. 9. From the output of this gate, the −8 volt potential energizes the 1 through 27 write back gates 202. At this time, the control leads of these gates are energized by the 1-side outputs of 1 through 27 flip-flops of the shift register 30 in FIG. 8. It is now recalled that the control word in the shift register in FIG. 8 is represented at this time by the 2 flip-flop in the set state and the 1 and 3 through 27 flip-flops in the reset state. As a consequence, the 1-side output of the set 2 flip-flop of the shift register supplies a priming −8 volt potential on lead 165 to the control lead of its associated 2 gate of the write back gates 202 in FIG. 9 while the remaining 1-side outputs of the reset 1 and 3 through 27 flip-flops provide −24 volt potentials on lead 165 to the control leads of their associated 1 and 3 through 27 write back gate 202. The 2 write back gate 202 is thus enabled to transmit a −8 volt potential on the 2 lead of the 1 through 27 leads 167 in FIGS. 9, 12, 13 and 16 to the input of the 2 bit write amplifier 168 in FIG. 16 while the 1 and 3 through 27 write back gates 202 in FIG. 9 are blocked whereby no voltages are transmitted on the 1 and 3 through 27 leads 167 to the corresponding 1 and 3 through 27 bit write amplifiers 168 in FIG. 16.

At this time, the −8 volt potential effective on lead 272 in FIGS. 13 and 15 is also applied via the 1 lead in FIGS. 13 and 16 to the control word amplifier CW in FIG. 16. The simultaneous energization of the 2 bit write amplifier 168 and control word amplifier CW in FIG. 16 serves to write the 1 bit from the No. 2 position of the control word in the shift register into the No. 2 position of the control word into the incoming message slot A of twistor memory 38 in FIG. 16. This signifies that the 1 bit, as assumed, of the first text word of the incoming message is written into the No. 1 position of the first text word in the incoming message slot A in FIG. 16.

The output voltage of the 6 position of the clock ring counter 251 in FIG. 16 activates enabling AND gate 274 which is also receiving the output voltage of stage A of the associated trunk ring counter 253. Gate 274 transmits the −8 volt potential to the input of OR gate 275 which supplies this potential via lead 276 in FIGS. 13 and 14, OR gate 277 in FIG. 13, lead 278 in FIGS. 11, 12 and 13, gate 206 in FIG. 11, and lead 207, gate 160 and delay network 161 in FIGS. 8 and 9 to reset the 1 through 27 flip-flops of the shift register 30 in FIG. 8. As the 2 flip-flop only was in the set state, it is activated to the reset state while the remaining 1 and 3 through 27 flip-flops being already in the reset state are unaffected. The shift register is thus reset to erase the control word therefrom. The −8 volt potential in the output of gate 274 in FIG. 14 is also supplied on lead 279 in FIGS. 13 and 14 to reset the associated write control flip-flop 258.

The afore-described procedure is repeated for recording of the first bit of the first text word of the message incoming to slot B of the twistor memory 38 in FIG. 16, as well as for the first bit of the first text word of each message recorded in additional incoming message slots of the twistor memory in FIG. 16. In these instances, it is understood that the voltage outputs of the clock ring counter 251 in FIG. 14 are steered to the appropriate incoming message slots and associated incoming trunk circuits via flip-flops similar to incoming trunk circuit A in FIG. 16 and incoming flip-flop 262 in FIG. 13. At this time, it is therefore assumed that the first text bits of the first text words of all incoming messages are recorded in the appropriate incoming message slots of the twistor memory 38 in FIG. 16.

The output voltage of the 7 position of the clock ring counter 251 in FIG. 14 is used to read out a complete word from the twistor memory 38 in FIG. 16 for the purpose of checking the modulo 5 parity, in a manner that is presently described. It is noted, however, that such 7-position clock voltage serves that purpose only when a complete word is recorded in the appropriate incoming slot of the twistor memory. The complete first text word of the incoming message is recorded in the incoming message slot A in accordance with the procedure that is presently described. The 7-position clock voltage is applied to the control lead of enabling AND gate 280 which is also receiving at this time the output voltage of stage A of the associated trunk ring counter 253. The −8 volt potential outgoing from gate 280 is applied on lead 281 in FIGS. 13 and 14 to the input of enabling word AND gate 282 in FIG. 13. At this point it is recalled that the first bit of the first text word of the incoming message is stored in the No. 1 position in the twistor memory and the control word is also stored therein in the form: 010 . . . 0; and word flip-flop 283 is in the reset state because the end of a word is not yet reached. As a consequence, the 1-side output of flip-flop 283 supplies a −24 volt potential to the control lead of gate 282 which is thereby blocked.

The recording of the discrete bits of the first text word of the message to incoming message slot A of the twistor memory in FIG. 16 is continued until the completion of the recording of such first text word is indicated. This is represented by the 27-bit control word recorded in the twistor memory in the form: 000 . . . 1, as shown in Table A. In this connection, it is understood that the bit representation of the control word is the same for identifying corresponding bits in text words of messages being transmitted and received. Let it now be assumed that the first 26 bits of the first text word are recorded in incoming message slot A of the twistor memory in FIG. 16 in the manner just described, and further that the corresponding control word just mentioned has been transferred from twistor memory into the shift register in FIG. 8. At this time the 27th bit of the first text word is recorded in the No. 27 position in incoming message slot A of the twistor memory 38 in FIG. 16.

When the shift register is advanced one stage in response to the output voltage of the 4 position of the clock ring counter 251 in FIG. 14, the −8 volt potential representing the transmission of the 1 bit from the No. 27 position of the control word is applied on lead 214 in FIGS. 8 and 9 and on lead 214a in FIGS. 12 and 13 to the input of enabling AND gate 284 in FIG. 13. At the same time, this 1 bit is inserted into the No. 1 position of the control word whose 27 bits are arranged as follows: 100 . . . 0, as shown in Table A. This control word is then transferred back to the control word slot A of the twistor memory in FIG. 16, indicating the recording of the 27th bit of the first text word of the message in incoming message slot A in FIG. 16; and the shift register is reset to erase the control word therefrom. Gate 284 is enabled by the −8 volt potential on lead 285 in FIGS. 13 and 14 as received from the output of stage A of the trunk ring counter 253 in FIG. 14. Gate 284 accepts and transmits the 16 volt positive going potential to the input of enabling AND gate 286 in FIG. 13, enabled by the −8 volt potential received from the 1-side output of write control flip-flop 258 which is in the set state at this time.

The −8 volt potential in the output of enabled gate 286 sets word flip-flop 283 whose 1-side output provides a −8 volt potential to enable word gate 282. This gate accepts and supplies the −8 volt potential via the 5 lead in FIGS. 13 and 16 and OR gate 287 in FIG. 16 to the associated 1 read gate enabled by the −8 volt potential supplied by the 1 position of word counter 42 in FIG. 16. It is recalled that the 1 position was assumed for the purpose of this description. This 1 read gate supplies the −8 volt potential to the input of its associated 1 read amplifier whose output via the 1 lead activates the 1 through 27 bit write amplifiers 192. This transfers the 27 bits of the first text word as now recorded in the twistor memory 38 in FIG. 16 via the 1 through 27 leads 101 to inputs of the 1 through 27 OR gates 100 whereby the first text word is stored in the shift register 30 in the manner hereinbefore explained. In this connection, it is recalled that the 1 through 27 flip-flops of the shift register are now in the reset state so that the 1 bits of the text word and parity serve to activate the corresponding flop-flops to the set state while the 0 bits of the text word and parity permit the corresponding flip-flops to remain in the reset state, for the reasons hereinbefore explained.

The voltage output of the 8 position of the clock ring counter 251 in FIG. 14 primes enabling AND gate 290 which is also receiving at this time the voltage output of stage A of the trunk ring counter 253 in FIG. 14. This gate transmits a −8 volt potential on lead 291 in FIGS. 13 and 14 to reset word flip-flop 283 in FIG. 13. This removes the enabling voltage from word gate 282 which is thereupon blocked.

The voltage output of the 9 position of the clock ring counter 251 in FIG. 14 primes enabling AND gate 292 which is also receiving the voltage output of stage A of the trunk ring counter 253 in FIG. 14. This gate transmits a −8 volt potential via OR gate 293 and lead 294 in FIGS. 9, 12, 13 and 14 to the inputs of 5 auxiliary parity checking OR gates 295, 296 and 297 included in the modulo 5 parity decoder 57 in FIG. 9, although only 3 of such gates are shown. The −8 volt outputs of these OR gates are supplied to associated enabling auxiliary parity checking AND gates 298, 299 and 300 which comprise 5 in number, although only 3 are illustrated in the drawing.

The five gates 298, 299 and 300 in FIG. 9 are enabled via the associated 23 through 27 leads and the corresponding 23 through 27 leads 165 by the −8 volt potentials that may possibly occur at the 1-side outputs of the associated 23 through 27 flip-flops of the shift register 30 in FIG. 8. The 1-side outputs of these flip-flops in the set states provide the −8 volt potentials to enable the corresponding AND gates 298, 299 and 300 for representing modulo 5 parity 1 bits but the 1-side outputs of these flip-flops in the reset states provide −24 volt potentials which block the respective AND gates for representing 0 parity bits. When read, the outputs of the enabled gates only of the auxiliary parity checking AND gates 298, 299 and 300 apply the −8 volt potentials to the set inputs of the associated parity bits 1, 2, 3, 4, and 5 memory flip-flops 301, 302 and 303, respectively, thereby activating the corresponding flip-flops to the set state. On the other hand, it is evident that the blocked AND gates fail to activate the associated flip-flops in any respect. Each of the parity bit memory flip-flops is thus set for each 1 bit stored in the 23 through 27 flip-flops of the shift register 30 in FIG. 8, reserved for the modulo 5 parity bits. The flip-flops 301, 302, and 303 were theretofore activated to the reset state in a manner that is subsequently mentioned.

The voltage output of the 9 position of clock ring counter 251 in FIG. 14 at the output of OR gate 293 in FIG. 14 is also used via lead 294 in FIGS. 9, 12, 13 and 14 and lead 129 in FIGS. 8 and 9 and OR gate 91 in FIG. 8 to set control modulo flip-flop 125 in FIG. 8. This flip-flop now provides a −8 volt potential at its 1-side output for enabling a checking of the accuracy of the received first word of the incoming message by computing a new modulo 5 parity count and a comparison of such new count with the modulo 5 parity bits received with the first text word. This check utilizes the same parity bit determining procedure explained hereinbefore in regard to FIG. 8 and again mentioned hereinafter relative to the 9 through 13 positions of clock ring counter 251 for checking the parity of the discrete text words transferred from the data equipment 9 to the shift register 30 in FIG. 8, except the simple parity bit voltage indicating "send the next word" signal on lead 32 to the data equipment 9 in FIG. 8 is not now required. This indication is therefore not sent in a manner that is now explained.

The voltage output from the 10 position of the clock ring counter 251 in FIG. 14 primes enabling AND gate 304 which is also receiving at this time the output voltage of stage A of the associated trunk ring counter 253. Gate 304 accepts and transmits a −8 volt potential via OR gate 305 and lead 306 in FIGS. 8, 11, 12, 13 and 14 to set simple parity inhibit flip flop 153 in FIG. 8 which then supplies a −8 volt potential to the control lead of the associated inhibiting gate 128. This blocks any voltage transmission through simple parity gate 151 to preclude therefrom the transmission of the send next word signal voltage on its output lead 32 to the data equipment 9. The output voltage of gate 304 in FIG. 14 is also applied via its associated OR gate 307 and lead 308 in FIGS. 13 and 14 to the input of erase enabling AND gate 309 in FIG. 13. This gate is blocked at the moment by the −24 volt potential received from the 1-side output of its associated word erase flip-flop 310 in the reset state. No further action is effected at gate 309 at the moment.

The output voltage from the 11 position of the clock ring counter 251 in FIG. 14 primes enabling AND gate 311 which is also receiving at this time the output voltage of stage A of the associated trunk ring counter 253. This gate supplies the −8 volt potential to its output lead 312 in FIGS. 13 and 14 to the input of reverse enabling AND gate 313 whose control lead is receiving a −24 volt potential from the 1-side output of word erase flip-flop 310 in the reset state. Gate 313 is thus blocked from transmitting voltage therethrough at this time.

The output voltage from the 12 position of the clock ring counter 251 in FIG. 14 primes enabling AND gate 314 which is also receiving at this time the output voltage of stage A of the associated trunk ring counter 253. This gate applies the −8 volt potential via its output lead 315 in FIGS. 13 and 14 to the input of erase word enabling AND gate 316 whose control lead is receiving a −24 volt potential from the 1-side output of word erase flip-flop 310 in the recent state. Gate 316 is thus blocked from transmitting voltage therethrough at this time.

While the voltage outputs of the 11 and 12 positions of the clock ring counter in FIG. 12 stimulated no action in the system for the reasons just mentioned, it is understood that the use of these two positions provided sufficient time to check the parity of the first text word stored in the shift register via the 1-side outputs of the 23 through 27 flip-flops included therein in FIG. 8. It is now recalled from the parity bit determining procedure described above regarding the circuit of FIGS. 8 and 9 that the −8 volt potential at the 1-side output of control modulo flip-flop 125 primed control modulo gate 130, as well as the five gates 105, 107, 107a, 107b, and 109, enable the 2 megacycle timing generator 131 to activate the modulo ring counter 103 for reading out the 23 through 27 parity gates 166 in FIG. 9. For this purpose, it is also now recalled in regard to the previous description of the circuit of FIG. 9 that the −8 volt potentials in the outputs of the five auxiliary parity checking gates 298, 299 and 300 set the associated five parity bit memory flip-flops 301, 302 and 303, respectively, at the same time depending on whether the corresponding 23 through 27 flip-flops of the shift register 30 were activated to the set state in response to 1 parity bits stored in the respective last-mentioned flip-flops. Obviously, the individual flip-flops 23 through 27 of the shift register storing 0 parity bits allow the corresponding parity bit memory flip-flops to remain in the reset state. Each of the parity bit memory flip-flops activated to the set state provides a −8 volt potential at its 1-side output whereas each of the parity bit memory flip flops remaining in the reset state supplies a −24 volt potential at its 1-side output.

In FIG. 9, it is seen that the 1-side output of the 1 parity bit memory flip-flop 301 is connected to one input of a No. 1 comparator whose second input is obtained from the 23 parity gate 166 in FIG. 9; the 1-side output of the 2 parity bit memory flip-flop 302 is connected to the one input of a No. 2 comparator whose second input is derived from the 24 parity gate 166 in FIG. 9; and the 1-side output of the 5 parity bit memory flip-flop 303 is connected to one input of the No. 5 comparator whose second input is received from the 27 parity gate 166 in FIG. 9. Each of these five comparators as shown in FIGS. 24A and 24B was previously described.

The output voltage from the 13 position of the clock ring counter 251 in FIG. 14 primes enabling AND gate 316 which is receiving at this time the output voltage from stage A of the associated trunk ring counter 253. This gate transmits a −8 volt potential via OR gate 317 and lead 318 to the 23 through 27 parity gates 166 in FIGS. 9, 10, 13 and 14. This voltage is passed through these OR gates to the inputs of the 23 through 27 enabling AND gate 166 which are primed one at a time by the outputs of the No. 1 through No. 5 parity bit binary counters 135 to 137 under control of the modulo ring counter 103 in FIG. 8. As the −8 volt potentials representing 1 bits from the outputs of the parity bit binary counters are presented one at a time to the inputs of the respective No. 1 through No. 5 comparators whose other inputs are receiving the −8 volt potentials from the 1-side outputs of respective 1 through 5 parity bit memory flip-flops 301 through 303, the −8 volt potentials from the outputs of the No. 1 through No. 5 comparators are applied one at a time to the input of comparator AND gate 320. Gate 320 provides a −8 volt potential on its output lead 321 only if the parity bit voltage indications received from the respective 23 through 27 parity bit gates 166 correspond with the parity bit indications effective at the 1-side outputs of the respective parity bit memory flip-flops 301 through No. 5. The −8 volt potential on lead 321 in FIGS. 9, 10 and 13 sets modulo 5 parity flip-flop 322.

The output voltage from the 14 position of the clock ring counter 251 in FIG. 14 primes enabling AND gate 323 which is receiving at this time the output voltage from stage A of the associated trunk ring counter 253. This gate is thereby activated to transmit a −8 volt potential on lead 324 to the inputs of both the OK parity enabling AND gate 325 and NG parity inhibiting AND gate 326 in FIG. 13. As both of these gates are energized at this time by the −8 volt potential supplied by the 1-side of modulo 5 parity flip-flop 322 in the set state, the OK gate 325 transmits the input of a −8 volt potential onto lead 327 to the input of OR gate 328 in FIG. 13. From the output of this gate, lead 329 transmits the −8 volt potential to the inputs of the 1 through 27 text gates 164 and the 1 through 27 parity gates in FIG. 9, and on lead 329a extending from lead 329 in FIG. 9 to the input of simple parity OK gate 152 in FIG. 8. This gate constitutes effectively the simple parity encoder 63 shown in FIG. 3.

As gate 152 is enabled by the 1-side output of simple pariy binary counter 149, this gate is enabled by such output to accept the −8 volt potential on lead 329a whenever a "1" occurs in the 1-side output of this binary counter for maintaining the simple parity of the text word being received via the incoming trunk circuit A in FIG. 16. The −8 volt potential in the output of gate 152 is applied on lead 330 in FIGS. 8, 11, 12, 13 and 16 to the input of the 1 bit write amplifier 168 which is activated when the 1 through 27 bit amplifiers 168 in FIG. 16 are activated in the manner that is now mentioned. Since the 1 through 22 text gates 164 and 23 through 27 parity gates 166 are activated by the −8 volt potential effective on lead 329 as just mentioned, the −8 volt potentials effective on the corresponding 1 through 27 output leads 167 therefrom are applied by these leads in FIGS. 9, 12, 13 and 16 to energize the respective 1 through 27 bit write amplifiers 168 in FIG. 16.

The outputs of the energized 1 through 27 bit write amplifiers 168 in FIG. 16 activate the corresponding twistor wires of the twistor memory while the associated first text word solenoid is also energized at this time by the output of the 1 write amplifier. The input of this amplifier is now receiving the −8 volt potential from the output of OK gate 325 in FIG. 13 via the 3 lead in FIGS. 13 and 16, OR gate 267, and the output of the 1 write gate which is primed by the output voltage of word counter 42 operating in its 1 position in FIG. 16. This writes the 1 bits of the first text word back into the twistor memory from the shift register 30 in FIG. 8. Obviously, the failure of any of the foregoing bit write amplifiers 168 in FIG. 16 to be so energized serves to provide 0 bits in the corresponding bit positions of the first text word. The first text word is thus written back into the twistor memory from the shift register 30 in FIG. 8. This indicates that the first text word is satisfactorily received but requires no corresponding return signal to the originating data station 11 in FIG. 1.

The −8 volt potential at the output of OK gate 325 in FIG. 13 is also applied via the associated OR gate 331, the 13 lead in FIGS. 13 and 16, and delay network 332 and OR gate 333 in FIG. 16 to the advance input of word counter 42. This input potential activates the word counter to its 2 position for recording the second word of the incoming message into second text word position of incoming message slot A in the twistor memory. The use of delay network provides sufficient time to rewrite the first text word from the shift register back into the twistor memory.

When a text word having an OK parity check in response to the output voltage of the 14th position of the clock ring counter 251 in FIG. 14 constitutes the last word of a ten-word or a five-word message, an appropriat signal is returned via lead 334 and incoming trunk circuit A in FIG. 16 to the originating data station 11 in FIG. 11, in a manner that is subsequently explained.

If the first text word provided a NG (no good) parity indication in responsive to the voltage output from the 14th position of the clock ring counter 251 in FIG. 14, an appropriate signal inquiring a retransmission of the first text word is returned via lead 335 and incoming trunk circuit A in FIG. 16 to the originating data station 11 in FIG. 1, in accordance with a procedure that is later described. At this time, it is noted that while a NG signal was returned to originating data station 11, this signal is also used to advance the word counter 42 in FIG. 16 to the next word position. This is necessary because during the time the NG signal is in transit to data station 11, this station may be in the process of sending the bits of the next word before the NG signal is effectively received thereat. This is so for the reason that since each text word of a message immediately follows the other in the transmission procedure, it is possible for originating data station 11 to receive the NG signal after several bits of the text word next succeeding the error word are transmitted to receiving data station 10. This necessitates a complete transmission to and recording of the next succeeding text word at the receiving data station 10 in FIG. 1 before corrective action is instituted in a manner that is hereinafter mentioned.

The output voltage from the 15 position of clock ring counter 251 in FIG. 14 primes enabling AND gate 340 which is also receiving at this time the output voltage from stage A of the associated trunk ring counter 253. This gate is thereby activated to transmit a —8 volt potential on its output lead 341 to reset word erase flip-flop 310 in FIG. 13. This occasions no further action at this flip-flop at the moment.

The output voltage from the 16 position of clock ring counter 251 in FIG. 14 primes enabling AND gate 342 which is also receiving at this time the output voltage from stage A of the associated trunk ring counter 253. This gate is thereby energized to transmit a —8 volt potential via OR gate 343 and lead 276 in FIG. 14, lead 276 and OR gate 277 in FIG. 13, lead 278 in FIGS. 11, 12 and 13, OR gate 206 and lead 207 in FIG. 11, and lead 207, OR gate 160 and delay network 161 in FIG. 8 to reset the 1 through 27 flip-flops of shift register 30. This activates those flip-flops in the set state to the reset state and exerts no effect on those flip-flops in the reset state. This erases the first text word from the shift register, but as aforementioned the first text word is now recorded in the twistor memory. At this time the next incoming message is in the process of transmission. It is noted that if the last word of a message were not being processed, no action results from the output voltages provided by the 7 through 16 positions of the clock ring counter 251 in FIG. 16.

*Modulo 5 parity NG procedure at station receiving error word.*—When the parity fails to check out satisfactorily at the 14 position of the clock ring counter 251 in FIG. 14, the —8 volt potential on lead 324 is applied the input of inhibiting AND gate 326 in FIG. 13 as hereinbefore mentioned. A —24 volt potential effective at the 1-side output of modulo 5 parity flip-flop 322 in the reset state is applied to the control lead of gate 326. As a consequence of such two voltages, gate 326 is enabled to transmit the —8 volt potential as a retransmit word signal on lead 335 to the incoming trunk circuit A in FIG. 16 and thereby to the originating data station 11 in FIG. 1. At the same time, gate 326 transmits the —8 volt potential to set word erase flip-flop 310 which provides its 1-side output with a —8 volt potential.

Now, the —8 volt potential from the 8-position of the clock ring counter 251 in FIG. 14 effective on lead 291 is applied via lead 291a to the input of a special enabling AND gate 344 in FIG. 13, enabled at this time by the —8 volt potential from the 1-side output of reset flip-flop 310. The —8 vote potential in the output of gate 344 is supplied via the 6 leads in FIGS. 13 and 14 to gate 287 and thereby to the 2 read gate in FIG. 14, enabled by the —8 volt potential from the output of the 2 position of the associated word counter 42. It is recalled now that the complete recording of a text word in error in the twistor memory 38 in FIG. 16 effects the advance of the word counter 42 in FIG. 16, in the manner hereinbefore described. For the purpose of this description, it is now assumed that the fifth text word of a ten-word message was recorded in error in the fifth word solenoid of incoming message slot A in twistor memory 38 in FIG. 16, and further that as a consequence the associated word counter is operative in its 6-position and the sixth text word is also recorded in the sixth solenoid of the twistor memory. It is understood that the following description would apply equally as well to any error word in a five-word message.

When it is time to read out the sixth word from twistor memory 38 in FIG. 16 into the shift register 30 in FIG. 8 as indicated by the transmission of the 1 bit from the 27th position of the control word and the insertion thereof into the 1st position of the control word as hereinbefore explained, the output voltage of the 8-position of the clock ring counter 251 applied via lead 291, in FIG. 14, special gate 344 in FIG. 13 and gate 287 in FIG. 16 activates the associated 6 read gate. This serves to read out the sixth text word from the twistor memory via the 1 through 27 read out amplifiers 192 in FIG. 16 and stored in the shift register, in the manner hereinbefore explained.

The output voltage from the 9-position of the clock ring counter 251 in FIG. 14 stimulates no action in the system. The output voltage from the 10-position of clock ring counter 251 in FIG. 14 is applied via the associated gate 307 and lead 308 to the input of erase gate 309, enabled by the —8 volt potential in the 1-side output of set word erase flip-flop 310 in FIG. 13. The —8 volt potential in the output of gate 309 is supplied to the input of gate 345 in FIG. 13 and thereby via gate 277 and lead 278 in FIG. 13, lead 278 in FIGS. 11 and 12, OR gate 206 and lead 207 in FIG. 11, and lead 207, gate 160, and delay network 161 to the shift register 30 in FIG. 8. This —8 volt potential advances the shift register one stage to erase the sixth word therefrom because the writeback procedure is inoperative at this time.

The output voltage from the 11-position of the clock ring counter 251 in FIG. 14 effective on its associated output lead 312 is supplied to the input of reverse gate 313 in FIG. 13, enabled by the —8 volt potential at the 1-side output of set word erase flip-flop 310. The —8 volt potential in the output of gate 313 is transmitted on the 12-lead in FIGS. 13 and 16 to reverse word counter 42 back to its 5 position. The output voltage from the 12-position of the clock ring counter 251 in FIG. 14 is transmitted on lead 315 in FIGS. 13 and 14 to the input of enabling AND gate 316, enabled at this time by the —8 volt potential from the 1-side output of word erase flip-flop 310 in the set state. The —8 volt potential in the output of gate 316 is applied via the 6 lead and gate 287 in FIGS. 13 and 16 to the input of the 5 read gate, enabled by the voltage supplied by the 5-position output of word counter 42. The output of the 5 word gate amplified by the associated 5 word amplifier activates the 5 word solenoid of twistor memory 38 which reads out the 5th text word via the 1 through 27 amplifiers 192 into the shift register 30 in FIG. 8, in accordance with the procedure hereinbefore explained.

The output voltage of the 13-position of the clock ring counter 251 in FIG. 14 effective on its output lead 318 results in no action in the system at this time. The output voltage of the 14 position of the clock ring counter 251 in FIG. 14 effective via lead 308 and erase gate 309 in FIG. 13 and the output circuit therefrom as previously traced is applied to the shift register 30 in FIG. 8. This voltage advances the shift register one stage to erase the error fifth word therefrom, as the write back procedure is inoperative at this time. As both the word in error (fifth) and the next following word (sixth) are both erased, the receiving equipment is again available to record the incoming message, commencing with the fifth word thereof. The output voltage from the 15-position of the clock ring counter in FIG. 14 effective on its output lead 341 resets word erase flip-flop 310 in FIG. 13, in preparation for the retransmission of the fifth word (in error initially) from the data station 11 in FIG. 1. The output voltage from the 16-position of the clock ring counter 251 in FIG. 14 is applied through the circuit previously traced to the shift register 30 in FIG. 8 for the purpose of resetting it. As the shift register was set by the effect of the 14-position output voltage of clock ring counter 251 in FIG. 14 as just mentioned, the output voltage of the 16-position of the clock ring counter performs no useful function at this time.

When a NG parity or retransmit word signal is sent to the data station originating the error word in a message via lead 335 and incoming trunk circuit A in FIG. 16, the data station originating the error word responds to such signal to effect a retransmission of the error word in accordance with the following procedure which is now explained.

*Modulo 5 parity NG procedure at station originating error word.*—The NG parity or retransmit signal voltage received at the receiving station via outgoing trunk circuit A and lead 350 in FIGS. 14 and 15 sets repeat word flip-flop 228 in FIG. 12. When the final bit of the word (sixth) following the word in error (fifth) is read out of the shift register 30 in FIG. 8, the —8 volt potential representing the 1 bit of the control word is transmitted via a circuit including lead 214 in FIGS. 8, 9 and 12, gates 215 and 226 and reversing AND gate 351 enabled by the —8 volt potential from the 1-side output of flip-flop 228 in the set state in FIG. 12, and lead 9 in FIGS. 12 and 15 to reverse word counter 42 in FIG. 15. As the fifth text word is assumed to be in error and the succeeding sixth word to be sent, the word counter is reversed back from its 6-position to its 5-position. The fifth text word is then retransmitted to the receiving data station 11 under control of the clock ring counter 182 in FIG. 11 in the manner hereinbefore described regarding the transmission of the first text word.

It may happen that the tenth word of a ten-word message or the fifth word of a five-word message is delivered in error to a receiving data station. Since the start read out flip-flop 177 in FIG. 12, which controls the read out procedure as previously explained, is reset at the conclusion of the last word of each message as above mentioned, this flip-flop is set via gate 176 from the 1-side output voltage of set repeat word flip-flop 228 for the purpose of rereading and thereby retransmitting the tenth or fifth word in accordance with the procedure hereinbefore outlined.

*Modulo 5 parity OK procedure at station originating correct message.*—It is now recalled from the foregoing explanation that the receiving data station 11 transmits a message received OK signal voltage via lead 334 and incoming trunk circuit A in FIG. 16 to the originating data station 10, upon the correct reception of the last text word of an incoming message at receiving data station 11. In the originating data station 10, this OK signal voltage applied through outgoing trunk circuit A and lead 352 in FIG. 15 sets parity OK flip-flop 211 in FIG. 14. The —8 volt potential in the 1-side output of flip-flop 211 inhibits gate 210 in FIG. 12 and thereby the 1 through 10 read gates in FIG. 15, and at the same time resets slot-A flip-flop 81 in FIG. 9 via lead 353 in FIGS. 9 and 12. This precludes the output voltages of clock ring counter 182 in FIG. 11 from reading out further bits via the 1 through 10 read gates from outgoing message slot A of twistor memory 38 in FIG. 15.

Since the message in outgoing message slot A of twistor memory 38 in FIG. 1 of data station 10 in FIG. 1 has been satisfactorily delivered to the incoming message slot A of the twistor memory in FIG. 16, the outgoing message is no longer required and may be destroyed by a destructive read out of outgoing message slot A in a manner that is now mentioned. The —8 volt potential in the output of gate 190 in FIG. 11, as energized by the corresponding output voltage of the 1-position of clock ring counter 182 and enabled by the output voltage of stage A of trunk ring counter 184, is applied via lead 237 in FIGS. 11, 12 and 13 to the input of associated OR gate 238 in FIG. 15 whose output potential is accepted by associated AND gate 239. This gate is enabled by the —8 volt potential available on lead 240 from the 1-side output of parity OK gate 211 in the set state in FIG. 12. The —8 volt potential in the output of gate 239 is accepted by the 1 erase gate enabled by the —8 volt potential in the output of the 1-position of word counter 42, which is assumed to be in this position because the first text word is to be erased. The —8 volt potential in the output of the 1 erase gate effective in the output of the associated 1 read amplifier reads out the first text word in outgoing message slot A of the twistor memory into the shift register 30 in FIG. 8, in accordance with the procedure previously described.

The —8 volt potential in the output of gate 190a in FIG. 11, as energized by the corresponding output voltage of the 2-position of clock ring counter 182 and enabled by the —8 volt potential of stage A of trunk ring counter 184, is applied to the input of OR gate 242 whose output is supplied to the input of AND gate 243, enabled by the —8 volt potential effective on lead 244 from the 1-side output of parity OK flip-flop 211 in FIG. 12 in the set state. The —8 volt potential in the output of enabled gate 243 applied via lead 207, gate 160 and delay network 161 in FIG. 8 advances the shift register 30 one stage to erase the first text word therefrom.

Returning now to the —8 volt potential in the output of gate 238 in FIG. 15, this potential is applied via delay network 241 to the input of AND gate 244, enabled by the —8 volt potential available on lead 240 from the 1-side output of parity OK gate 211 in the set state in FIG. 12. The —8 volt potential in the output of gate 244, after a predetermined amount of time delay provided by delay network 241 advances the word counter 42 into its 2-position for the purpose of reading out the second text word of the message. Thus, the output voltage of the 1-position of the clock ring counter 182 in FIG. 11 advances the word counter 42 in FIG. 15 while the output voltage of its 2-position erases the first text word from shift register 30 in FIG. 8.

In a similar manner, the voltage outputs of the 3 and 4 positions of the clock ring counter serve to advance the word counter into its 3-position and to erase the second text word from the shift register, respectively; the voltage outputs of the 5 and 6-positions of the clock ring counter serve to advance the word counter into its 4-position and to erase the third text word from the shift register, respectively; the voltage outputs of the 7 and 8 positions of the clock ring counter serve to advance the word counter into its 5-position and to erase the fourth text word from the shift register, respectively; and the voltage outputs of 9 and 10-positions of the clock ring counter serve to advance the word counter into its 6-position and to erase the fifth text word from the shift register. This action is effected during one bit interval as measured by the time duration of the 1 through 10 positions of the clock ring counter 182 in FIG. 11.

Also, in a similar manner during a second bit interval as measured by the time duration of another cycle of the 1 through 10-positions of the clock ring counter 182 in FIG. 11, the pairs of output voltages represented by the 1 and 2, 3 and 4, 5 and 6, 7 and 8, and 9 and 10-positions of the clock ring counter serve to advance the word counter through its 7, 8, 9, 10 and 1-positions for erasing the respective sixth, seventh, eighth, ninth, and tenth text words of the message from the shift register. At this time, the entire message that was satisfactorily transmitted to the desired data station 11 as above mentioned is now erased from outgoing message slot A of the twistor memory 38 in FIG. 15.

At the conclusion of the erasure of the tenth text word from twistor memory 38 as just mentioned, the voltage effective at the output of gate 224 from the 10-position of clock ring counter 182 in FIG. 11 and applied on lead 224a sets erase flip-flop 245 in FIG. 12. At the same time, the —8 volt potential on lead 224a is accepted by enabling AND gate 246, enabled by the —8 volt potential in the 1-side output of flip-flop 245 in the set state. The —8 volt potential in the output of gate 246 is accepted by enabling AND gate 247, enabled by the —8 volt potential from the 1-side output of flip-flop 211 in the set state. The voltage from the output of gate 247 resets flip-flops 211 and 245. In the case of a five-word message, when the fifth word is erased, the voltage effective at the output of gate 208 from the 6-position of the clock ring counter 182 in FIG. 11 is applied on lead 209 to the input of enabling AND gate 209a enabled by the voltage at the 1-side output of the set short message flip-flop 173. The output of gate 209a is applied on leads 209b and 224a to the set input of erase flip-flop 245 and to gate 246, enabled by the 1-side output voltage of flip-flop 245 in the set state. The voltage output of gate 246 is accepted by gate 247, enabled by the voltage at the 1-side output of set flip-flop 211. The voltage from the output of gate 247 resets flip-flop 211. It is therefore apparent that the foregoing procedure is usable to erase the satisfactorily transmitted messages from outgoing message slot B and other outgoing message slots in the twistor memory 38 in FIG. 15.

Figure 10:
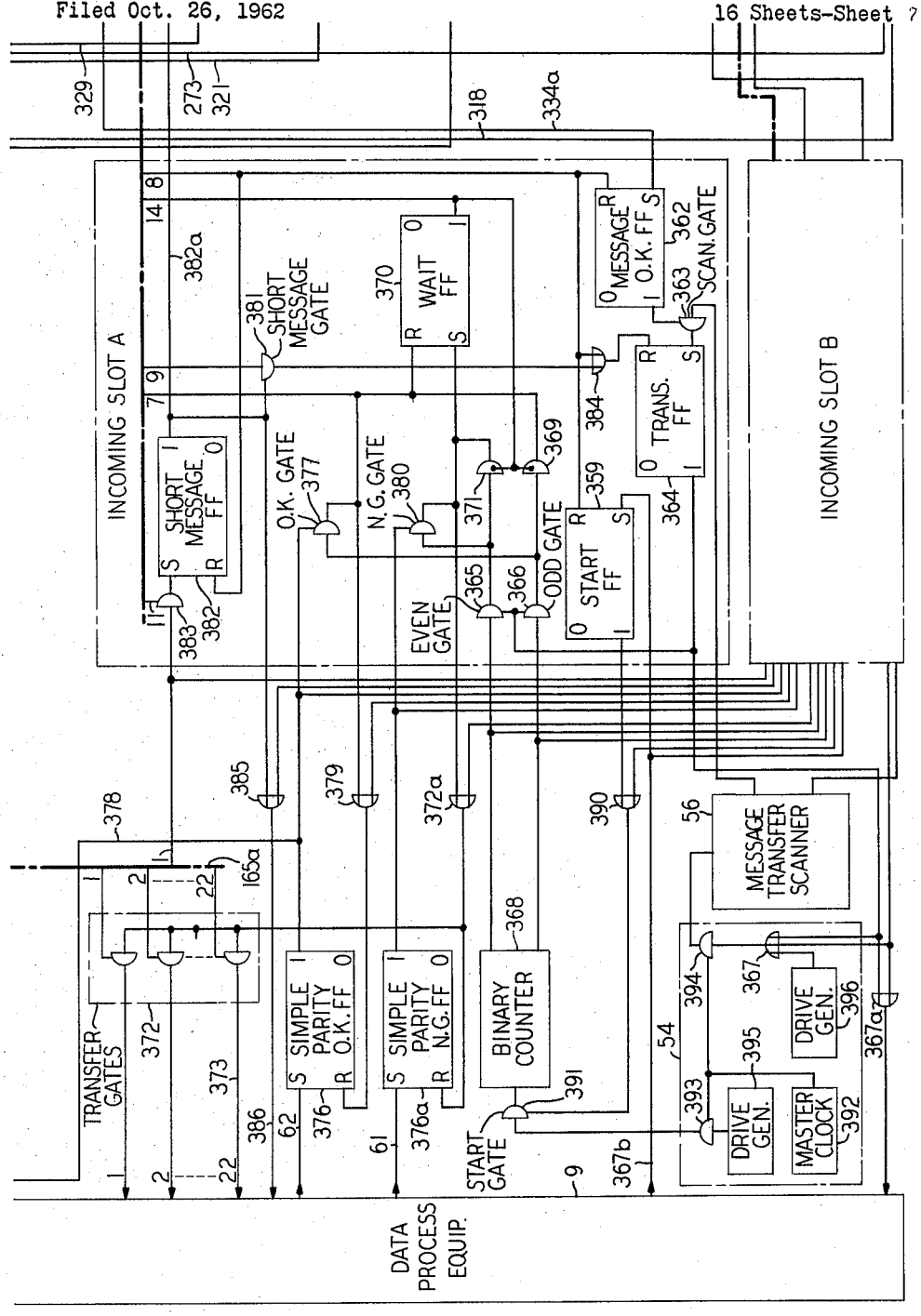

*Message transfer from receiving equipment to data processing equipment.*—As the incoming message is now correctly recorded in incoming slot A of twistor memory 38 in FIG. 16, the message is ready for transfer one word at a time to the associated data processing equipment 9 in FIG. 10. This figure includes an incoming trunk scanner or a message transfer scanner 56 which is essentially a ring counter of a type similar to the individual clock ring counters 182 and 251 shown in FIGS. 11 and 14, respectively. It is noted that the message transfer scanner comprises a number of stages equal to the number of incoming message slots in the twistor memory 38 in FIG. 16 thereby insuring a read out of the incoming message in each slot in turn into the data processing equipment. As the message transfer scanner 56 scans each incoming message slot of the twistor memory and as each such slot is connected to an individual incoming trunk, the message transfer scanner is effectively scanning the individual incoming trunks in turn.

When the incoming message checks out satisfactorily gate 325 is enabled to transmit the —8 volt potential from its output on lead 327 in FIG. 13 as hereinbefore mentioned. At the same time, the —8 volt potential in the output of gate 325 is supplied to the input of enabling AND gate 361 primed by the voltage ouput on the 8 lead in FIGS. 13 and 14 from the 10th position of word counter 42 in FIG. 16 at the end of the ten-word message. Gate 325 transmits the message received OK signal voltage from its output via enabled gate 361 and onto lead 334 in FIGS. 13 and 16 as previously mentioned. In addition, the —8 volt potential in the output of gate 361 applied to lead 334a in FIGS. 10 and 13 sets message OK flip-flop 362 whose 1-side output potential of —8 volts primes enabling AND gate 363 in FIG. 10. When message transfer scanner 56 in FIG. 10 provides a —8 volt potential to the input of scan gate 363, this potential accepted thereby sets transfer flip-flop 364 which supplies a —8 volt output potential from its 1-side output to prime even and odd enabling AND gates 365 and 366, respectively, and is applied via enabling AND gate 394 for disabling the message transfer scanner 56 in a manner, not shown, but understood in the art and via OR gate 367a to inform the data processing equipment 9 a message is ready.

In due course, the data processing equipment 9 in FIG. 10 returns a send message signal voltage on lead 367b to set start flip-flop 359 which provides from its 1-side output a —8 volt potential through OR gate 390 to prime start enabling AND gate 391 which activates binary counter 368. A clock circuit 54 including a master clock 392, drive pulse generators 395 and 396, and enabling AND gates 393 and 394 controls the processing of the incoming messages, and allows sufficient time for the transfer of incoming messages from the incoming message slots of the twistor memory into the data processing equipment. Master clock 392 provides timed voltage pulses which prime enabling AND gates 393 and 394 supplied with input voltages from the pulse drive generators 395 and 396, respectively. It is understood that the master clock 180 in FIG. 11 and the master clock 392 in FIG. 10 are actually one mechanism but are shown as separate mechanisms only for the purpose of facilitating an expeditious comprehension of the operations of the processing of the outgoing and incoming message slots of the twistor memory in FIGS. 15 and 16.

The input voltages for the even and odd gates 365 and 366 are obtained from binary counter 368, and these voltages effective in the even and odd gate outputs read out the words from the twistor memory 38 in FIG. 16 in accordance with a procedure that is presently seen. The odd gate output is transmitted through inhibiting one gate 369 primed by the —24 volt potential obtained from the 1-side output of wait flip-flop 370 in the reset state. The output voltage from gate 369 is applied via the 7-lead in FIGS. 10, 13 and 16 to the input of gate 287 in FIG. 16. This gate supplies its output voltage to the 1 read gate which is primed by the output voltage from the 1-position of the associated word counter 42. This read gate energizes its associated 1 read amplifier which reads out the first word of incoming message slot A from the twistor memory 38 via the 1 through 27 bit read out amplifiers 192 and 1 through 27 leads 101 in FIG. 16 into the shift register 30 in FIG. 8, in the manner previously explained.

The —8 volt potential from the output of even gate 365 in FIG. 10 is accepted by inhibiting two gate 371 primed by the —24 volt potential received from the 1-side output of flip-flop 370 in the reset state. The output of gate 371 applied through OR gate 372a activates the 1 through 22 transfer gates 372 primed or not primed via leads 165 and 165a by the output voltages of the 1 through 22 flip-flops of the shift register 30 in FIG. 8. It is now recalled from the previous description that the first text word is stored in the shift register. At the same time, the voltage output of gate 371 sets wait flip-flop 370 in FIG. 10 whose 1-side output voltage of —8 volts applied via the 14 lead in FIGS. 10 and 16, and gate ADV in FIG. 16 advances the word counter 42 to its 2-position.

The —8 volt potentials from the 1-side outputs of the set 1 through 22 flip-flops of the shift register prime the corresponding 1 through 22 transfer gates 372 for indicating the transfer of 1 bits but the —24 volt potentials from the 1-side outputs of the reset 1 through 22 flip-flops of the shift register do not prime the corresponding 1 through 22 transfer gates 372 for indicating the transfer of 0 bits. As a consequence, the primed transfer gates transmit output voltages whereas the non-primed transfer gates do not transmit output voltages. Thus, the 1 and 0 bit indications of the first text word are simultaneously transmitted in parallel via the corresponding 1 through 22 circuits 373 into the data processing equipment. The first text word of the message in incoming slot A of the twistor memory 38 in FIG. 16 is thus transferred into the data processing equipment in FIG. 10. It is understood that the circuits 373 may comprise coaxial transmission lines and amplifiers to supply the respective 1 bits with appropriate magnitudes to the data processing equipment. After the first text word is transferred into the data processing equipment as just mentioned, action is suspended until a parity OK signal voltage is received therefrom on lead 62, provided such parity signal is initiated by the data processing equipment to indicate the next text word may be transferred thereto.

Assuming a parity OK signal voltage was received on lead 62, this voltage sets simple parity OK flip-flop 376 whose 1-side output potential of —8 volts primes enabling OK AND gate 377 and at the same time via lead 378 in FIGS. 8, 9 and 10 resets the 1 through 27 flip-flops of the shift register in FIG. 8, in preparation for the transfer of the second text word from the twistor memory 38 in FIG. 16 to the data processing equipment 9 in FIG. 10 in the manner just described for the transfer of the first text word. The output voltage of gate 377 resets wait flip-flop 370 whose 1-side output of −24 volts enables both inhibiting gates 369 and 371. Now, the output voltage of gate 369 performs the following functions: (1) it resets flip-flop 370; (2) it acts via OR gate 379 to reset simple parity OK flip-flop 376; and (3) it is effective on the 7-lead in FIGS. 10, 13 and 16 to activate the 2 read gate and amplifier in FIG. 16 to read out the second text word from the twistor memory into the shift register, in the manner of the read out of the first text word as just explained. It is noted that the 2 read gate is primed by the output voltage from the 2-position of the word counter 42.

The next output from gate 365 in FIG. 10 is accepted by inhibiting gate 371, enabled by the 1-side output of −24 volts of reset flip-flop 370. The −8 volt potential in the output of gate 371 is applied via gate 372a to the inputs of the 1 through 22 transfer gates 372 primed by the −8 volt potentials in the 1-side outputs of the set 1 through 22 flip-flops of the shift register for indicating the transfer of 1 bits but not primed by the −24 volt outputs of the reset 1 through 22 flip-flops of the shift register for indicating the transfer of 0 bits, in accordance with the procedure of transferring the 1 and 0 bits of the first text word from the shift register to the data processing equipment 9 in FIG. 10, in the manner just explained. The second text word of the message in incoming slot A of the twistor memory 38 in FIG. 16 is thus transferred via the 1 through 22 transfer gates 372 and corresponding 1 through 22 circuits 373 into the data processing equipment 9. Again, the read out of the 1 through 22 transfer gates 372 for the second text word as just mentioned is accompanied by the simultaneous setting of wait flip-flop 370 whose 1-side output of −8 volts inhibits both gates 369 and 371. This precludes further read out of the 1 through 22 transfer gates 372 until a parity OK signal voltage is supplied by the data processing equipment to lead 62.

Now, assuming that a parity NG signal voltage was applied by data processing equipment to lead 61 in FIG. 10, in response to the transfer of the second text word thereto, this voltage sets the simple parity NG flip-flop 376a whose 1-side output voltage of −8 volts primes no good parity NG gate 380. As this gate is also supplied with −8 volt potential at this time from the output of gate 365, gate 380 supplies the −8 volt potential to the set input of flip-flop 370 which is already activated to the set state by the output voltage of gate 371. Hence, there is continued the inhibiting of gates 369 and 371 by the 1-side output of −8 volts of set flip-flop 370. The voltage output of gate 366 is ineffective at this time since both gates 369 and 377 are presently blocked to voltage transmission. In addition, gate 377 is also blocked to voltage transmission. However, the −8 volt potential from the output of gate 365 is accepted by enabled gate 380, and transmitted therethrough to the set input of wait flip-flop 370 which is already in the set state and via gate 372a to the inputs of the 1 through 27 transfer gates to stimulate another read out of the second text word stored in the shift register. This procedure is continued until the data processing equipment 9 in FIG. 10 returns a parity OK signal voltage on lead 62 to set flip-flop 376.

In a manner similar to that for transferring the first and second text words, the third through tenth text words of the message recorded in incoming message slot A of the twistor memory 38 in FIG. 16 are transferred to the data processing equipment in FIG. 10. After the tenth text word is transferred, the parity OK signal voltage applied to lead 62 by the data processing equipment 9 in FIG. 10 sets flip-flop 376 whose 1-side output voltage enables gate 377 which accepts the output voltage from gate 366 for resetting flip-flop 370, and the output voltage supplied by the 10 position of word counter 42 and effective on the 8 lead in FIGS. 10, 13 and 16 resets flip-flops 362 and 364 in FIG. 10.

In the event a five-word incoming message, instead of a ten-word message, was being transferred from twistor memory 38 in FIG. 16 to data processing equipment 9 in FIG. 10, the output voltage supplied by the 6-position of the word counter 42 in FIG. 16 and effective on the 9 lead in FIGS. 10, 13 and 16 is accepted by short-message enabling AND gate 381 in FIG. 10. This gate is enabled by a −8 volt potential received from the 1-side output of short message flip-flop 382 in the set state. This 1-side output voltage of flip-flop 382 is also supplied via OR gate 385 and output lead 386 to inform the data processing equipment 9 in FIG. 10 that a short or five-word message is to be transferred thereto. Flip-flop 382 is activated to the set state by the −8 volt potential received from the output of enabling AND gate 383 which accepts a −8 volt potential from the 1-side output of the 1 set flip-flop of the shift register 30 in FIG. 8 and which is enabled by the output voltage received from the 1-position of the word counter 42 in FIG. 16 and effective on the 11 lead in FIGS. 10, 13 and 16.

In addition, the −8 volt potential available in the 1-side output of set flip-flop 382 in FIG. 10 and effective on lead 382a in FIGS. 10 and 13 primes enabling AND gate 382b. At this time, the −8 volt potential in the output of gate 325 is applied on lead 327 to the input of enabling AND gate 382c which is primed by the −8 volt potential effective on lead 10 in FIGS. 13 and 16. Gate 382c therefore transmits the −8 volt potential to the input of primed gate 382b which transmits the −8 volt potential as a "message received OK signal" on lead 334 and outgoing trunk circuit A in FIGS. 13 and 14 to the originating data station 11. At the same time, the −8 volt potential in the 1-side output of gate 382b is applied on lead 334a to set flip-flop 362 in FIGS. 10 and 13. This initiates the procedure to transfer the five words of the short message from the twistor memory 38 in FIG. 16 via the shift register 30 and gates 372 in FIGS. 8 and 10, respectively, to the data processing equipment 9 in FIG. 10, as hereinbefore explained in connection with the transfer of a ten-word message.

The output voltage from enabled gate 381 is applied through OR gate 384 to reset flip-flop 364. This completes the transfer of the ten or five-word message from the incoming message slot A of twistor memory 38 in FIG. 16 to the data processing equipment 9 in FIG. 10.

In accordance with the identical procedure as aforedescribed, the remaining incoming messages in incoming message slot B, as well as other incoming message slots, of the twistor memory 38 in FIG. 16 are transferred therefrom to data processing equipment 9 in FIG. 10.

What is claimed is:
1. In a transmitter for a digital data message including at least one word having a preselected number of bits, comprising: means for storing said message word and an internal control word, said control word having a number of bits equal to the preselected number of bits in said message word and including only one selected bit of a possible two binary bits in a predetermined position to indicate the availability of the first bit of a message word at hand for transmission, a source for providing a predetermined number of discrete voltage pulses in corresponding distinct time slots of a repetitive timing cycle, a transmission line, means actuated by a first group of said timing pulses in associated distinct time slots of said repetitive timing cycle for activating said storing means to transmit one bit of said message word to said transmission line in correspondence with each of said shiftings of said selected bit position-by-position in said control word until said whole message word is transmitted from said storing means to said transmission line on a bit-by-bit basis.

2. In a transmitter for a digital data message containing a plurality of words, each including a preselected number of bits, comprising means for storing said plurality of message words and an internal control word, said control word having a number of bits equal to said preselected number of bits in each of said message words, said control word also including only one selected bit of a possible two binary bits in a predetermined position to indicate the availability of the first bit of a first word of a message at hand for transmission, a transmission line, a source for providing a predetermined number of discrete timing voltage pulses in corresponding distinct timing slots of a repetitive timing cycle, means actuated by first groups of said timing pulses in associated distinct time slots of said repetitive timing cycle to activate said storing means for shifting said selected bit from said predetermined position one position at a time until said certain bit is returned to said predetermined bit position in said control word for a number of times equal to the number of words in said message at hand, and means responsive to second groups of said timing pulses in associated distinct time slots of said repetitive time cycle for activating said storing means to transmit one bit from the respective message words in turn to said transmission line in correspondence with each of said shiftings of said selected bit one position at a time in said control word until each complete word of said message at hand is transmitted from said storing means to said transmission line on a bit-by-bit basis.

3. In a transmitter for a plurality of digital data messages, each containing a plurality of words, each including a preselected number of bits, comprising means including a plurality of memory message slots, each storing the words of one message and an internal control word, said control word having a number of bits equal to said preselected number of bits of each message word and including only one selected bit of a possible two binary bits in a predetermined position for indicating the availability of a first bit of a first word of a first message at hand for transmission, a transmission line, a source for providing a predetermined number of discrete voltage pulses in corresponding distinct time slots of a repetitive timing cycle, means responsive to some of said timing pulses in associated distinct time slots of said repetitive timing cycle to activate said memory means for shifting said selected bit one position at a time until said predetermined position is again reached in each of said control words in turn for a number of times corresponding to the number of words in each of said messages at hand, and means responsive to second groups of said timing pulses in associated distinct time slots to activate said memory means for transmitting one bit from each word of each message in turn to said transmission line in correspondence with each of said shiftings of said selected bit in each of said control words in turn until each complete word of each of said messages in turn is transmitted from said memory means to said transmission line on a bit-by-bit basis.

4. In a receiver for a digital data message containing at least one word including a preselected number of bits, comprising a line for transmitting said message word incoming to said receiver on a bit-by-bit basis, first means for initially storing an internal control word including a number of bits equal to the preselected number of bits in said message word and having only one selected bit of a possible two binary bits in a predetermined position to indicate the availability of said receiver to receive the first bit of said message word incoming on said line, second means for storing said incoming message word, a source for providing a predetermined number of discrete voltage pulses in corresponding distinct time slots of a repetitive timing cycle, means responsive to a first group of said timing pulses in associated distinct time slots of said repetitive timing cycle to activate said first storing means for shifting said selected bit one position at a time from said predetermined position until said selected bit is returned again to said predetermined position in said control word, and means responsive to a second group of said timing pulses in associated distinct time slots of said repetitive timing cycle for activating said second storing means to store therein each message word bit received from said transmission line in a position corresponding with the position of said selected bit in said control word in said repetitive timing cycle until said entire message word is stored in said message storing means on a bit-by-bit basis.

5. In a receiver for a digital data message including at least one word having a preselected number of bits, comprising a line for transmitting said message word incoming to said receiver on a bit-by-bit basis, first means for storing said incoming message word, second means for initially storing a control word including a number of bits equal to the preselected number of bits in said incoming message word and having only one selected bit of a possible two binary bits in a predetermined position to indicate the availability of said receiver to receive a first bit of said incoming message word, a source for providing a predetermined number of discrete voltage pulses in corresponding distinct time slots of a repetitive timing cycle, third means for temporarily storing said control word, means actuated by a first one of said timing pulses in an associated time slot of said repetitive timing cycle to operate said second storing means to transfer said control word therefrom to said third storing means, means responsive to a second one of said timing pulses in an associated distinct timing slot of said repetitive timing cycle to activate said first storing means to write in thereinto an incoming bit from said line in a position corresponding to the position of said selected bit in said control word in said second storing means, means responsive to a third one of said timing pulses in an associated distinct timing slot of said repetitive timing cycle to advance said third storing means one stage at a time to remove a bit from one end position and to restore it to the opposite end position while at the same time shifting the remaining bits one position between said one and opposite end positions until said certain bit is shifted to said predetermined position in said control word, and means activated by a fourth one of timing pulses in an associated distinct time slot of said repetitive timing cycle to actuate said third storing means to transfer said shifted control word therefrom to said second storing means for storing said entire message word incoming from said line in said first storing means on a bit-by-bit basis.

6. In a receiver for a data message comprising a plurality of words, each including a preselected number of bits, comprising a line for transmitting each of said message words in turn on a bit-by-bit basis, first means for storing each of said message words in turn incoming on said line, second means for initially storing a control word including a number of bits equal to the preselected number of bits in each of said message words and having one selected bit of a possible two binary bits in a predetermined position to indicate the availability of said receiver to receive a first bit of a first message word incoming on said line, a source for providing a predetermined number of discrete voltage pulses in corresponding distinct timing slots of a repetitive timing cycle, means activated by first groups of said timing pulses in associated distinct timing slots of said repetitive timing cycle to operate said second storing means for shifting said selected bit one position at a time away from said predetermined position until said selected bit is returned again to said predetermined position for a number of times equal to the number of words in said message, and means activated by a second group of said timing pulses in associated distinct timing slots of said repetitive timing cycle for operating said first storing means to write in therein one bit of each incoming message word in turn in a position corresponding to each position of said selected bit as said last-mentioned bit is shifted in said control word until said incoming complete message words are written into said first storage means on a bit-by-bit basis.

7. In a receiver for a plurality of data messages, each including a plurality of words, each including a plurality of bits, comprising a plurality of transmission lines, one for each of said messages, means for storing a control word and the words of each message incoming on one of said lines, each of said control words having a number of bits equal to the number of bits in each word of each of said messages incoming on one of said lines and including only one selected bit of a possible two binary bits in a predetermined position for indicating the availability of said receiver to receive a first bit of a first word of each of said messages, a source for providing a predetermined number of discrete voltage pulses in corresponding distinct timing slots of a repetitive timing cycle, means activated by first groups of said timing pulses in associated distinct timing slots of said repetitive timing cycle to operate said storing means for shifting said selected bit one position at a time away from said predetermined position until said selected bit is again returned to said predetermined position in each of said control words for a number of times equal to the number of words in each of said messages, and means activated by others of said timing pulses in associated distinct timing slots of said repetitive cycle for operating said storing means to write in one bit of each incoming message word in turn on each of said lines in a position corresponding to each position of said selected bit in each of said control words in turn until said incoming complete message words are written in said storing means.

8. In a system for communicating a digital data message of at least one word having a preselected number of bits, comprising a transmitter, a receiver, and a transmission line interconnecting said transmitter and receiver, said transmitter including means for storing said message word and an internal control word, said control word having a number of bits equal to said preselected number of bits in said message word and including only one selected bit of a possible two binary bits in a predetermined position to indicate the availability of said storing means for message transmission, a clock source for providing a predetermined number of discrete voltage pulses in corresponding distinct time slots of a repetitive timing cycle, means actuated by a first group of said timing pulses to activate said storing means for shifting said selected bit one position at a time from said predetermined position until said selected bit is again returned to said predetermined position, and means operated by a second group of said timing pulses for activating said storing means to transmit one bit of said message word to said line in correspondence with each of said shiftings of said selected bit in said control word one position at a time for transmitting said message word from said storing means to said line on a bit-by-bit basis, said receiver including means for storing said message word and an internal control word, said last-mentioned control word being identical with said transmitter control word and including said selected bit, a second clock source for providing a predetermined number of discrete voltage pulses in corresponding distinct time slots of a second repetitive timing cycle, means responsive to a first group of said pulses of said second clock source to activate said receiver storing means for shifting said selected bit one position at a time therein until said selected bit is returned again to said predetermined position in said receiver control word, and means responsive to a second group of said second clock pulses for activating said receiver storing means to store therein each entire message word received from said line in a position corresponding with the respective positions of said selected bit in said receiver control word on a bit-by-bit basis.

References Cited by the Examiner
UNITED STATES PATENTS 3,037,191    5/1962    Crosby _____ 340—146.1

OTHER REFERENCES

1955, "Arithmetic Operations in Digital Computers," R. K. Richards, Van Nostrand Co.

ROBERT C. BAILEY, *Primary Examiner.*

M. LISS, *Assistant Examiner.*